(12) United States Patent
Khlat

(10) Patent No.: US 9,843,342 B2
(45) Date of Patent: Dec. 12, 2017

(54) TUNABLE RF TRANSMIT/RECEIVE MULTIPLEXER

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 14/922,803

(22) Filed: Oct. 26, 2015

(65) Prior Publication Data

US 2016/0049965 A1 Feb. 18, 2016

Related U.S. Application Data

(63) Continuation-in-part of application No. 14/824,937, filed on Aug. 12, 2015.

(60) Provisional application No. 62/068,073, filed on Oct. 24, 2014, provisional application No. 62/036,210, filed on Aug. 12, 2014.

(51) Int. Cl.
*H04B 1/00* (2006.01)

(52) U.S. Cl.
CPC ......... *H04B 1/0057* (2013.01); *H04B 1/0064* (2013.01)

(58) Field of Classification Search
CPC ............................ H04B 1/0057; H04B 1/0064
See application file for complete search history.

(56) References Cited

U.S. PATENT DOCUMENTS

| | | | |
|---|---|---|---|
| 5,408,679 A | 4/1995 | Masuda | |
| 5,715,525 A | 2/1998 | Tarusawa et al. | |
| 7,636,554 B2 * | 12/2009 | Sugar | H04B 1/005 455/272 |
| 7,773,965 B1 | 8/2010 | Van Brunt et al. | |
| 8,680,947 B1 | 3/2014 | Costa et al. | |
| 8,693,599 B2 | 4/2014 | Araki et al. | |
| 8,767,859 B2 | 7/2014 | Fukamachi et al. | |
| 2002/0016183 A1 | 2/2002 | Lehtinen | |
| 2002/0183016 A1 | 12/2002 | Kemmochi et al. | |
| 2003/0189974 A1 | 10/2003 | Ferry | |
| 2004/0048634 A1 | 3/2004 | Satoh et al. | |
| 2005/0037800 A1 | 2/2005 | Shih | |
| 2005/0245201 A1 | 11/2005 | Ella et al. | |
| 2006/0044080 A1 | 3/2006 | Hagiwara et al. | |
| 2006/0079275 A1 | 4/2006 | Ella et al. | |

(Continued)

OTHER PUBLICATIONS

Non-Final Office Action for U.S. Appl. No. 14/824,937, mailed Feb. 7, 2017, 7 pages.

(Continued)

*Primary Examiner* — Duc C Ho

(74) *Attorney, Agent, or Firm* — Withrow & Terranova, P.L.L.C.

(57) ABSTRACT

A tunable RF transmit/receive (TX/RX) multiplexer, which includes a tunable RF TX/RX diplexing circuit and a first group of RF RX bandpass filters, is disclosed. The tunable RF TX/RX diplexing circuit has a first RX connection node and a first antenna port, which is coupled to a first RF antenna. Each of the first group of RF RX bandpass filters is coupled to the first RX connection node. At least two of the first group of RF RX bandpass filters simultaneously receive and filter respective RF input signals via the first RX connection node to provide respective filtered RF input signals.

20 Claims, 29 Drawing Sheets

(56) References Cited

U.S. PATENT DOCUMENTS

| | | |
|---|---|---|
| 2006/0088122 A1 | 4/2006 | Choi et al. |
| 2006/0094393 A1 | 5/2006 | Okuyama et al. |
| 2006/0250182 A1 | 11/2006 | Takeda et al. |
| 2007/0075803 A1* | 4/2007 | Kemmochi .......... H04B 1/0057 333/132 |
| 2008/0102760 A1 | 5/2008 | McConnell et al. |
| 2009/0135781 A1 | 5/2009 | Vaisanen et al. |
| 2011/0110452 A1* | 5/2011 | Fukamachi ......... H01P 1/20336 375/267 |
| 2011/0234335 A1 | 9/2011 | Khlat |
| 2013/0162495 A1 | 6/2013 | Kwon et al. |
| 2014/0035700 A1 | 2/2014 | Zeng et al. |
| 2014/0065985 A1 | 3/2014 | Weissman et al. |
| 2014/0308906 A1 | 10/2014 | Saji et al. |
| 2014/0376428 A1 | 12/2014 | Verma et al. |
| 2015/0118978 A1 | 4/2015 | Khlat |
| 2015/0257007 A1 | 9/2015 | Solondz |
| 2017/0012651 A1 | 1/2017 | Ella et al. |

OTHER PUBLICATIONS

Notice of Allowance for U.S. Appl. No. 14/824,937, dated Jun. 2, 2017, 5 pages.

Non-Final Office Action for U.S. Appl. No. 14/926,116, dated Jun. 2, 2017, 11 pages.

\* cited by examiner

TUNABLE RF TRANSMIT/RECEIVE MULTIPLEXER

RELATED APPLICATIONS

The present application claims priority to U.S. provisional patent application No. 62/068,073, filed Oct. 24, 2014, the disclosure of which is hereby incorporated herein by reference in its entirety.

The present application claims priority to and is a continuation-in-part of U.S. patent application Ser. No. 14/824,937, filed Aug. 12, 2015, now U.S. Pat. No. 9,780,866, entitled "CONFIGURABLE RF TRANSMIT/RECEIVE MULTIPLEXER," which claims priority to U.S. provisional patent application No. 62/036,210, filed Aug. 12, 2014.

All of the applications listed above are hereby incorporated herein by reference in their entireties.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, and efficient.

SUMMARY

A tunable RF transmit/receive (TX/RX) multiplexer, which includes a tunable RF TX/RX diplexing circuit and a first group of RF RX bandpass filters, is disclosed according to one embodiment of the present disclosure. The tunable RF TX/RX diplexing circuit has a first RX connection node and a first antenna port, which is coupled to a first RF antenna. Each of the first group of RF RX bandpass filters is coupled to the first RX connection node. At least two of the first group of RF RX bandpass filters simultaneously receive and filter respective RF input signals via the first RX connection node to provide respective filtered RF input signals.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

A tunable RF transmit/receive (TX/RX) multiplexer, which includes a tunable RF TX/RX diplexing circuit and a first group of RF RX bandpass filters, is disclosed according to one embodiment of the present disclosure. The tunable RF TX/RX diplexing circuit has a first RX connection node and a first antenna port, which is coupled to a first RF antenna. Each of the first group of RF RX bandpass filters is coupled to the first RX connection node. At least two of the first group of RF RX bandpass filters simultaneously receive and filter respective RF input signals via the first RX connection node to provide respective filtered RF input signals.

Figure 1:
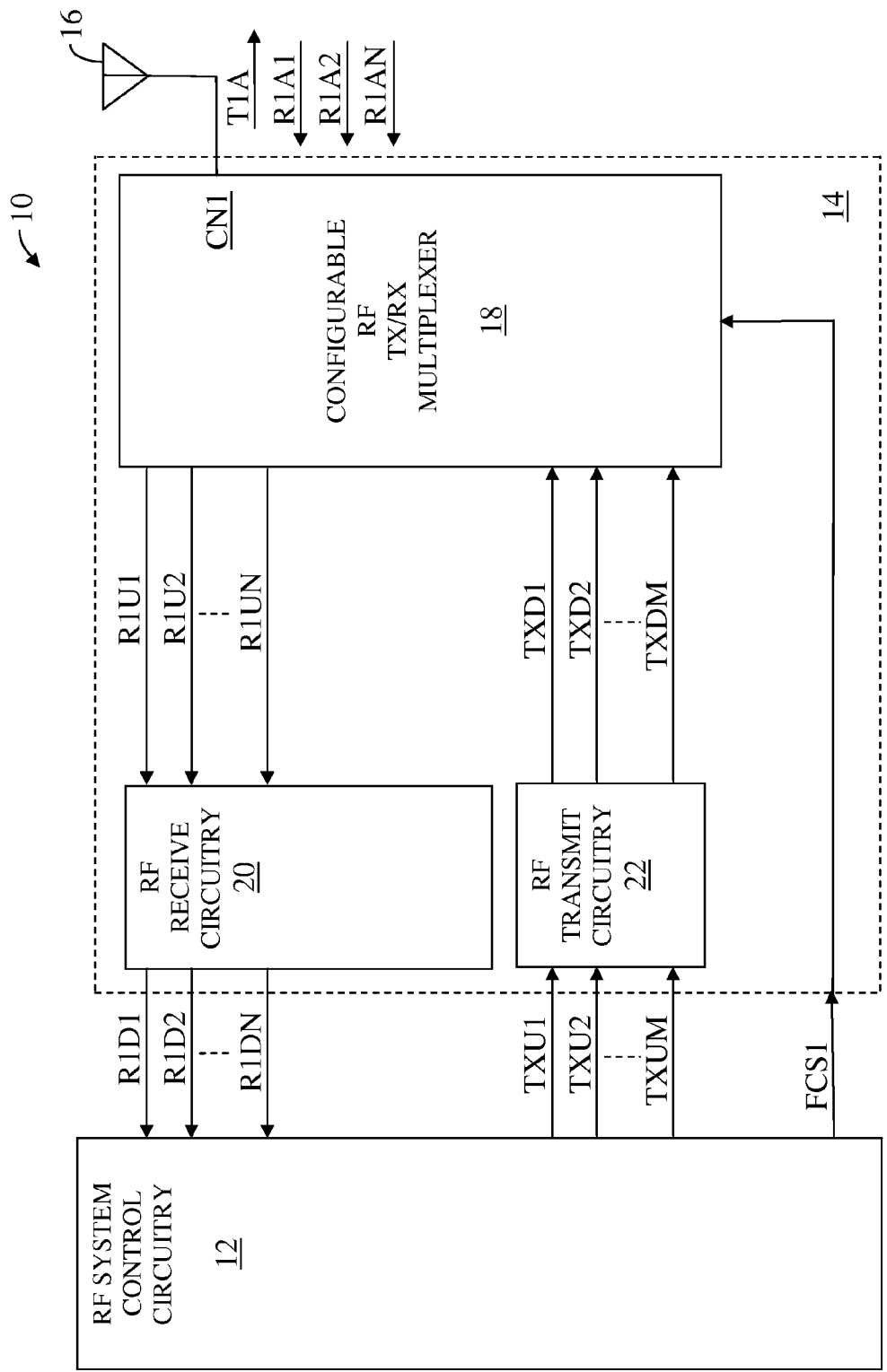
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes RF system control circuitry 12, RF front-end circuitry 14, and a first RF antenna 16. The RF front-end circuitry 14 includes a configurable RF TX/RX multiplexer 18, RF receive circuitry 20, and RF transmit circuitry 22. The configurable RF TX/RX multiplexer 18 has a first antenna port CN1, which is coupled to the first RF antenna 16. In one embodiment of the configurable RF TX/RX multiplexer 18, the first antenna port CN1 is directly coupled to the first RF antenna 16. The RF system control circuitry 12 provides a first function configuration signal FCS1 to the configurable RF TX/RX multiplexer 18. As such, in one embodiment of the configurable RF TX/RX multiplexer 18, the RF system control circuitry 12 configures the configurable RF TX/RX multiplexer 18 using the first function configuration signal FCS1.

In one embodiment of the RF system control circuitry 12, the RF system control circuitry 12 provides a first upstream RF TX signal TXU1, a second upstream RF TX signal TXU2, and up to and including an $M^{TH}$ upstream RF TX signal TXUM to the RF transmit circuitry 22. In general, the RF system control circuitry 12 provides a group of upstream RF TX signals TXU1, TXU2, TXUM to the RF transmit circuitry 22.

The RF transmit circuitry 22 processes the first upstream RF TX signal TXU1 to provide a first downstream RF TX signal TXD1 to the configurable RF TX/RX multiplexer 18, the second upstream RF TX signal TXU1 to provide a second downstream RF TX signal TXD2 to the configurable RF TX/RX multiplexer 18, and up to and including the $M^{TH}$ upstream RF TX signal TXUM to provide an $M^{TH}$ downstream RF TX signal TXDM to the configurable RF TX/RX multiplexer 18. In general, the RF transmit circuitry 22 provides a group of downstream RF TX signals TXD1, TXD2, TXDM to the configurable RF TX/RX multiplexer 18.

In one embodiment of the RF system control circuitry 12, the RF system control circuitry 12 selects one of the group of downstream RF TX signals TXD1, TXD2, TXDM using the first function configuration signal FCS1, such that the configurable RF TX/RX multiplexer 18 processes and forwards the selected one of the group of downstream RF TX signals TXD1, TXD2, TXDM to the first antenna port CN1 to provide a first RF antenna TX signal T1A, which is transmitted via the first RF antenna 16.

The RF transmit circuitry 22 may include up-conversion circuitry, amplification circuitry, power supply circuitry, filtering circuitry, switching circuitry, combining circuitry, splitting circuitry, dividing circuitry, clocking circuitry, the like, or any combination thereof to process the first upstream RF TX signal TXU1. In one embodiment of the RF transmit circuitry 22, the RF transmit circuitry 22 includes circuitry to reduce interference of RF receive signals in the configurable RF TX/RX multiplexer 18 by processing the group of downstream RF TX signals TXD1, TXD2, TXDM in the configurable RF TX/RX multiplexer 18.

In one embodiment of the configurable RF TX/RX multiplexer 18, the configurable RF TX/RX multiplexer 18 receives any or all of a first antenna, first RF receive signal R1A1; a first antenna, second RF receive signal R1A2; and up to and including a first antenna, $N^{TH}$ RF receive signal R1AN; which are received via the first RF antenna 16. In general, the configurable RF TX/RX multiplexer 18 receives any or all of a group of first antenna RF RX signals R1A1, R1A2, R1AN from the first antenna port CN1. In one embodiment of the group of first antenna RF RX signals R1A1, R1A2, R1AN, any or all of the group of first antenna RF RX signals R1A1, R1A2, R1AN are received simultaneously, such that the configurable RF TX/RX multiplexer 18 supports receive downlink carrier aggregation (RXDLCA).

The configurable RF TX/RX multiplexer 18 processes and forwards any or all of the group of first antenna RF RX signals R1A1, R1A2, R1AN from the first antenna port CN1 to provide any or all of a first antenna, first upstream RF receive signal R1U1, a first antenna, second upstream RF receive signal R1U2, and up to and including a first antenna, $N^{TH}$ upstream RF receive signal R1UN. In general, the configurable RF TX/RX multiplexer 18 provides any or all of a group of first antenna, upstream RF receive signals R1U1, R1U2, R1UN to the RF receive circuitry 20.

In one embodiment of the RF receive circuitry 20, the RF receive circuitry 20 receives and processes any or all of the group of the first antenna, upstream RF receive signals R1U1, R1U2, R1UN to provide a corresponding any or all of a group of first antenna, downstream RF receive signals R1D1, R1D2, R1DN.

In an additional embodiment of the RF receive circuitry 20, the RF receive circuitry 20 simultaneously receives and processes any or all of the group of first antenna, upstream RF receive signals R1U1, R1U2, R1UN. As such, the RF receive circuitry 20 supports RXDLCA. The RF receive circuitry 20 may include down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

In one embodiment of the RF front-end circuitry 14, any or all of the group of first antenna RF RX signals R1A1, R1A2, R1AN and the first RF antenna TX signal T1A, any or all of the group of first antenna, upstream RF receive signals R1U1, R1U2, R1UN, any or all of the group of first antenna, downstream RF receive signals R1D1, R1D2, R1DN, any or all of the group of upstream RF TX signals TXU1, TXU2, TXUM, and any or all of the group of downstream RF TX signals TXD1, TXD2, TXDM are omitted.

In one embodiment of the RF system control circuitry 12, the RF system control circuitry 12 provides the first function configuration signal FCS1 to the configurable RF TX/RX multiplexer 18, the RF receive circuitry 20, and the RF transmit circuitry 22. As such, the RF system control circuitry 12 may configure, tune, adjust, enable, disable, vary, or any combination thereof, circuits within the configurable RF TX/RX multiplexer 18, the RF receive circuitry 20, the RF transmit circuitry 22, or any combination thereof, as necessary using the first function configuration signal FCS1.

Figure 2:
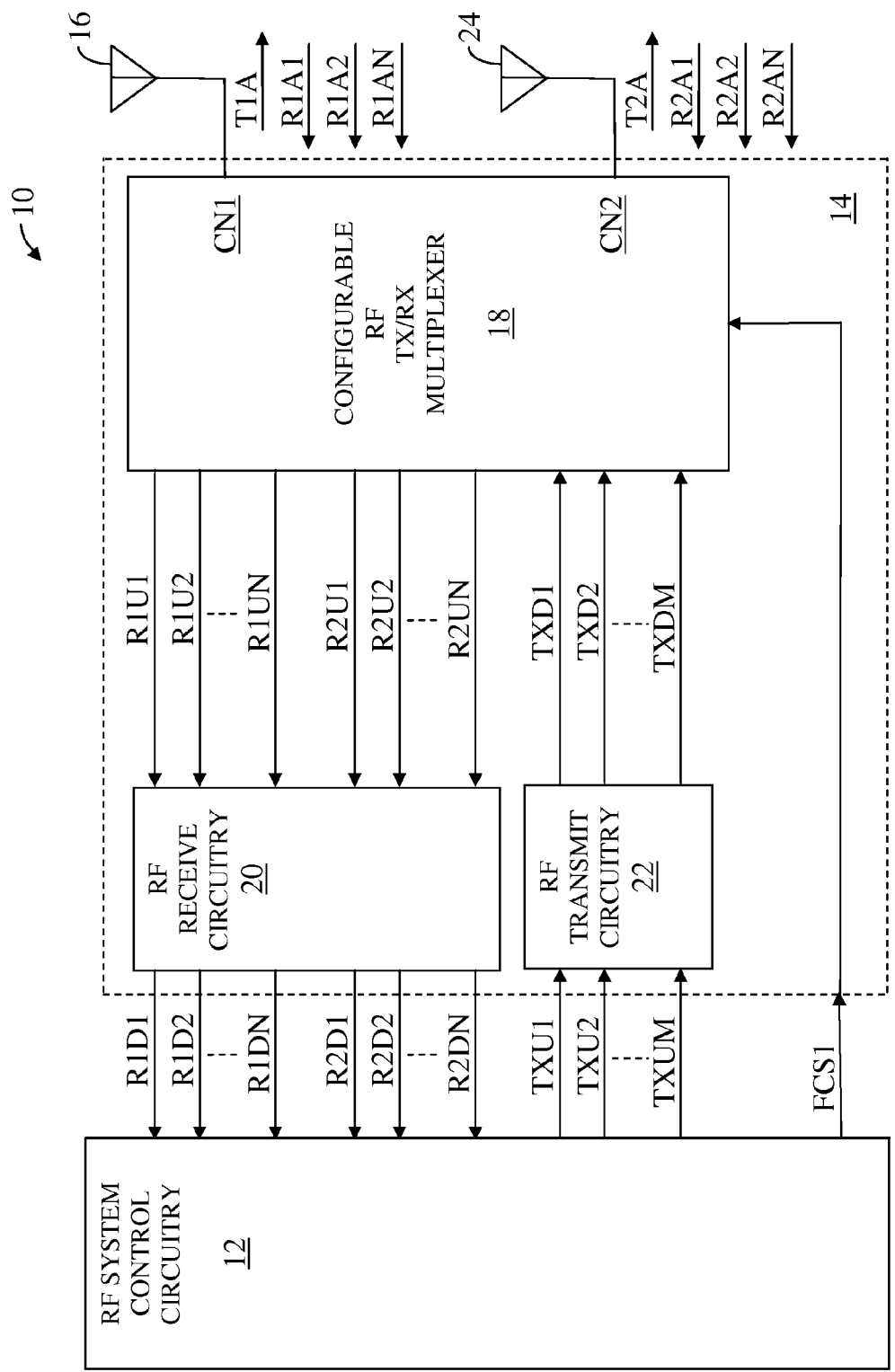
FIG. 2 shows the RF communications circuitry according to an alternate embodiment of the RF communications circuitry.

FIG. 2 shows the RF communications circuitry 10 according to an alternate embodiment of the RF communications circuitry 10. The RF communications circuitry 10 illustrated in FIG. 2 is similar to the RF communications circuitry 10 illustrated in FIG. 1, except the RF communications circuitry 10 illustrated in FIG. 2 further includes a second RF antenna 24. Additionally, the configurable RF TX/RX multiplexer 18 further has a second antenna port CN2, which is coupled to the second RF antenna 24.

In one embodiment of the RF system control circuitry 12, the RF system control circuitry 12 selects one of the group of downstream RF TX signals TXD1, TXD2, TXDM using the first function configuration signal FCS1, such that the configurable RF TX/RX multiplexer 18 processes and forwards the selected one of the group of downstream RF TX signals TXD1, TXD2, TXDM to a selected one of the first antenna port CN1 and the second antenna port CN2.

If the selected one of the first antenna port CN1 and the second antenna port CN2 is the first antenna port CN1, then the configurable RF TX/RX multiplexer 18 processes and forwards the selected one of the group of downstream RF TX signals TXD1, TXD2, TXDM to provide the first RF antenna TX signal T1A, which is transmitted via the first RF antenna 16. If the selected one of the first antenna port CN1 and the second antenna port CN2 is the second antenna port CN2, then the configurable RF TX/RX multiplexer 18 processes and forwards the selected one of the group of downstream RF TX signals TXD1, TXD2, TXDM to provide a second RF antenna TX signal T2A, which is transmitted via the second RF antenna 24.

In one embodiment of the configurable RF TX/RX multiplexer 18, the configurable RF TX/RX multiplexer 18 receives any or all of a second antenna, first RF receive signal R2A1; a second antenna, second RF receive signal R2A2; and up to and including a second antenna, $N^{TH}$ RF receive signal R2AN; which are received via the second RF antenna 24. In general, the configurable RF TX/RX multiplexer 18 receives any or all of a group of first antenna RF RX signals R1A1, R1A2, R1AN from the first antenna port CN1 and any or all of a group of second antenna RF RX signals R2A1, R2A2, R2AN from the second antenna port CN2.

In one embodiment of the group of first antenna RF RX signals R1A1, R1A2, R1AN and the group of second antenna RF RX signals R2A1, R2A2, R2AN, any or all of the group of first antenna RF RX signals R1A1, R1A2, R1AN and the group of second antenna RF RX signals R2A1, R2A2, R2AN are received simultaneously, such that the configurable RF TX/RX multiplexer 18 supports RXDLCA.

The configurable RF TX/RX multiplexer 18 processes and forwards any or all of the group of first antenna RF RX signals R1A1, R1A2, R1AN from the first antenna port CN1 to provide any or all of the first antenna, first upstream RF receive signal R1U1, the first antenna, second upstream RF receive signal R1U2, and up to and including the first antenna, $N^{TH}$ upstream RF receive signal R1UN.

Further, the configurable RF TX/RX multiplexer 18 processes and forwards any or all of the group of second antenna RF RX signals R2A1, R2A2, R2AN from the second antenna port CN2 to provide any or all of a second antenna, first upstream RF receive signal R2U1, a second antenna, second upstream RF receive signal R2U2, and up to and including a second antenna, $N^{TH}$ upstream RF receive signal R2UN.

In general, the configurable RF TX/RX multiplexer 18 provides any or all of the group of first antenna, upstream RF receive signals R1U1, R1U2, R1UN and the group of second antenna, upstream RF receive signals R2U1, R2U2, R2UN to the RF receive circuitry 20.

In one embodiment of the RF receive circuitry 20, the RF receive circuitry 20 receives and processes any or all of the first group of the first antenna, upstream RF receive signals R1U1, R1U2, R1UN and the group of the second antenna, upstream RF receive signals R2U1, R2U2, R2UN to provide a corresponding any or all of the group of first antenna, downstream RF receive signals R1D1, R1D2, R1DN and a group of second antenna, downstream RF receive signals R2D1, R2D2, R2DN.

In an additional embodiment of the RF receive circuitry 20, the RF receive circuitry 20 simultaneously receives and processes any or all of the group of first antenna, upstream RF receive signals R1U1, R1U2, R1UN and the group of second antenna, upstream RF receive signals R2U1, R2U2, R2UN. As such, the RF receive circuitry 20 supports RXDLCA.

Figure 3:
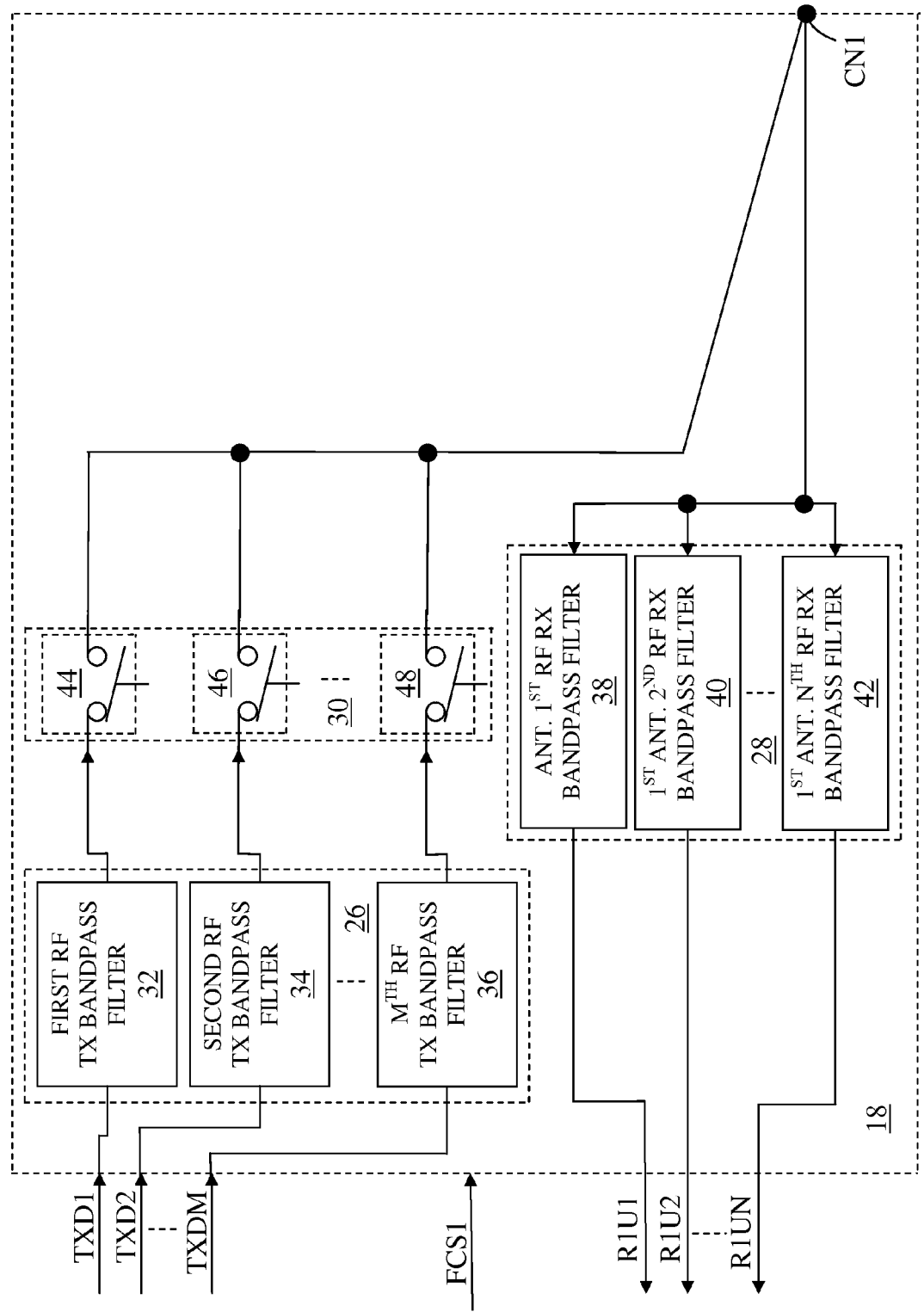
FIG. 3 shows details of a configurable RF TX/RX multiplexer illustrated in FIG. 1 according to one embodiment of the configurable RF TX/RX multiplexer.

FIG. 3 shows details of the configurable RF TX/RX multiplexer 18 illustrated in FIG. 1 according to one embodiment of the configurable RF TX/RX multiplexer 18. The configurable RF TX/RX multiplexer 18 includes a group 26 of RF TX bandpass filters, a first group 28 of RF RX bandpass filters, and a first group 30 of RF TX switching elements. Additionally, the configurable RF TX/RX multiplexer 18 has the first antenna port CN1.

The group 26 of RF TX bandpass filters includes a first RF TX bandpass filter 32, a second RF TX bandpass filter 34, and up to and including an $M^{TH}$ RF TX bandpass filter 36. The first group 28 of RF RX bandpass filters includes a first antenna first RF RX bandpass filter 38, a first antenna second RF RX bandpass filter 40, and up to and including a first antenna $N^{TH}$ RF RX bandpass filter 42. The first group 30 of RF TX switching elements incudes a first antenna first RF TX switching element 44, a first antenna second RF TX switching element 46, and up to and including a first antenna $M^{TH}$ RF TX switching element 48.

In one embodiment of the first group 28 of RF RX bandpass filters, each of the first group 28 of RF RX bandpass filters is coupled to the first antenna port CN1. As such, the first antenna first RF RX bandpass filter 38 is coupled to the first antenna port CN1, the first antenna second RF RX bandpass filter 40 is coupled to the first antenna port CN1, and the first antenna $N^{TH}$ RF RX bandpass filter 42 is coupled to the first antenna port CN1. In an alternate embodiment of the first group 28 of RF RX bandpass filters, any of the first group 28 of RF RX bandpass filters are omitted. In one embodiment of the first group 28 of RF RX bandpass filters, each of the first group 28 of RF RX bandpass filters is directly coupled to the first antenna port CN1.

The first antenna first RF RX bandpass filter 38 receives and filters the first antenna, first RF receive signal R1A1 (FIG. 1) via the first antenna port CN1 to provide the first antenna, first upstream RF receive signal R1U1. The first antenna second RF RX bandpass filter 40 receives and filters the first antenna, second RF receive signal R1A2 (FIG. 1) via the first antenna port CN1 to provide the first antenna, second upstream RF receive signal R1U2. The first antenna $N^{TH}$ RF RX bandpass filter 42 receives and filters the first antenna, $N^{TH}$ RF receive signal R1AN (FIG. 1) via the first antenna port CN1 to provide the first antenna, $N^{TH}$ upstream RF receive signal R1UN. In general, the first group 28 of RF RX bandpass filters provides the group of first antenna, upstream RF receive signals R1U1, R1U2, R1UN.

In general, the first group 30 of RF TX switching elements is coupled between the group 26 of RF TX bandpass filters and the first antenna port CN1, such that each of the first group 30 of RF TX switching elements is coupled between a corresponding one of the group 26 of RF TX bandpass filters and the first antenna port CN1. Specifically, the first antenna first RF TX switching element 44 is coupled between the first RF TX bandpass filter 32 and the first antenna port CN1. The first antenna second RF TX switching element 46 is coupled between the second RF TX bandpass filter 34 and the first antenna port CN1. The first antenna $M^{TH}$ RF TX switching element 48 is coupled between the $M^{TH}$ RF TX bandpass filter 36 and the first antenna port CN1.

When the selected one of the group of downstream RF TX signals TXD1, TXD2, TXDM to provide the first RF antenna TX signal T1A (FIG. 1) is the first downstream RF TX signal TXD1, the first antenna first RF TX switching element 44 is CLOSED and each of a balance of the first group 30 of RF TX switching elements is OPEN. When the selected one of the group of downstream RF TX signals TXD1, TXD2, TXDM to provide the first RF antenna TX signal T1A (FIG. 1) is the second downstream RF TX signal TXD2, the first antenna second RF TX switching element 46 is CLOSED and each of a balance of the first group 30 of RF TX switching elements is OPEN. When the selected one of the group of downstream RF TX signals TXD1, TXD2, TXDM to provide the first RF antenna TX signal T1A (FIG. 1) is the $M^{TH}$ downstream RF TX signal TXDM, the first antenna $M^{TH}$ RF TX switching element 48 is CLOSED and each of a balance of the first group 30 of RF TX switching elements is OPEN.

Figure 4:
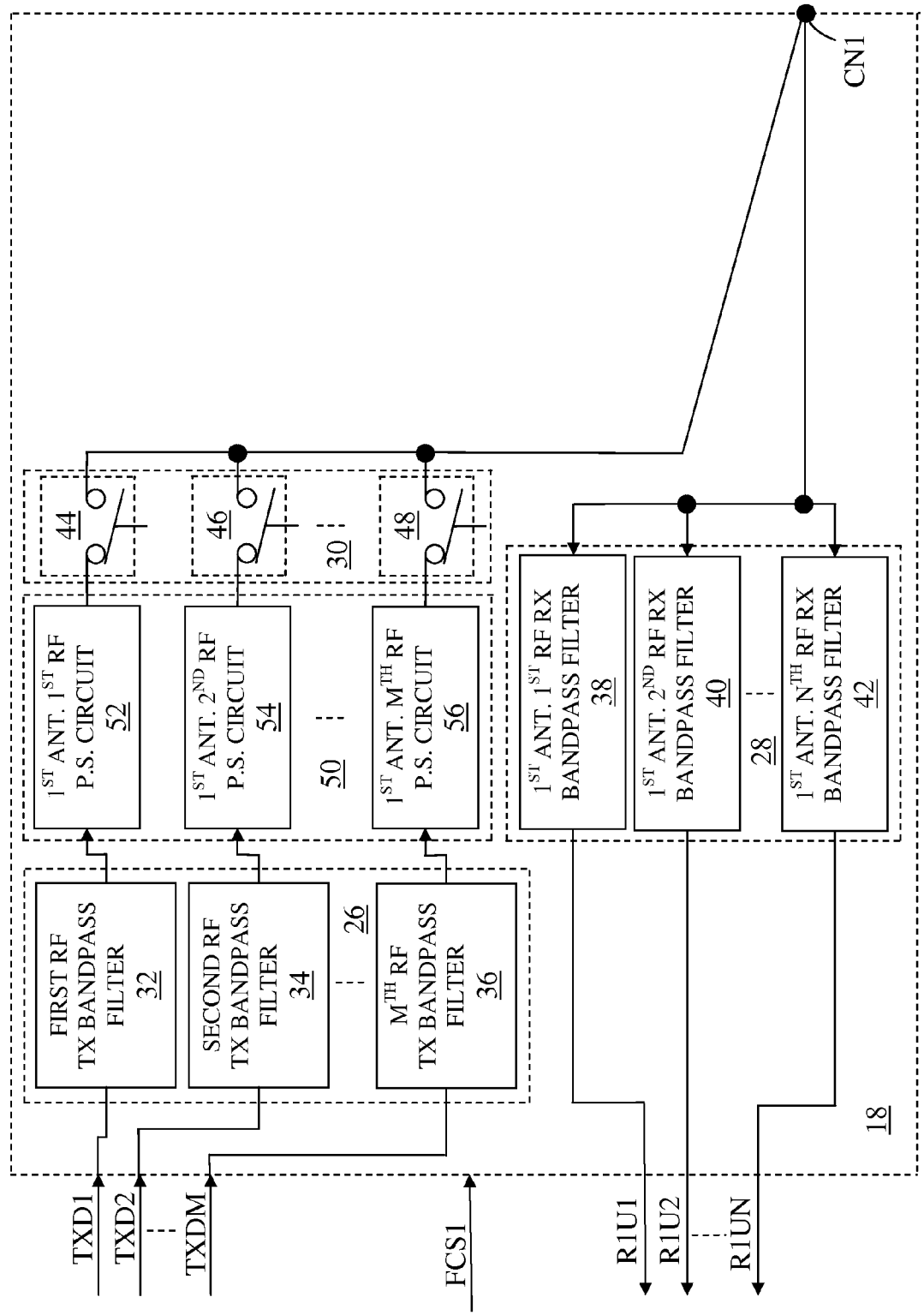
FIG. 4 shows details of the configurable RF TX/RX multiplexer illustrated in FIG. 1 according to an alternate embodiment of the configurable RF TX/RX multiplexer.

FIG. 4 shows details of the configurable RF TX/RX multiplexer 18 illustrated in FIG. 1 according to an alternate embodiment of the configurable RF TX/RX multiplexer 18. The configurable RF TX/RX multiplexer 18 illustrated in FIG. 4 is similar to the configurable RF TX/RX multiplexer 18 illustrated in FIG. 3, except the configurable RF TX/RX multiplexer 18 illustrated in FIG. 4 further includes a first group 50 of RF phase-shifting circuits. The first group 50 of RF phase-shifting circuits includes a first antenna first RF phase-shifting circuit 52, a first antenna second RF phase-shifting circuit 54, and up to and including a first antenna $M^{TH}$ RF phase-shifting circuit 56.

In general, the first group 50 of RF phase-shifting circuits is coupled between the group 26 of RF TX bandpass filters and the first group 30 of RF TX switching elements, such that each of the first group 50 of RF phase-shifting circuits is coupled between a corresponding one of the group 26 of RF TX bandpass filters and a corresponding one of the first group 30 of RF TX switching elements.

Specifically, the first antenna first RF phase-shifting circuit 52 is coupled between the first RF TX bandpass filter 32 and the first antenna first RF TX switching element 44. The first antenna second RF phase-shifting circuit 54 is coupled between the second RF TX bandpass filter 34 and the first antenna second RF TX switching element 46. The first antenna $M^{TH}$ RF phase-shifting circuit 56 is coupled between the $M^{TH}$ RF TX bandpass filter 36 and the first antenna $M^{TH}$ RF TX switching element 48.

In one embodiment of the first group 50 of RF phase-shifting circuits, each of the first group 50 of RF phase-shifting circuits applies an appropriate phase-shift, such that the group 26 of RF TX bandpass filters and the first group 28 of RF RX bandpass filters support full-duplex operation without significantly interfering with one another. In one embodiment of the first group 50 of RF phase-shifting circuits, each of the first group 50 of RF phase-shifting circuits includes a shunt capacitive element coupled to ground.

Figure 5:
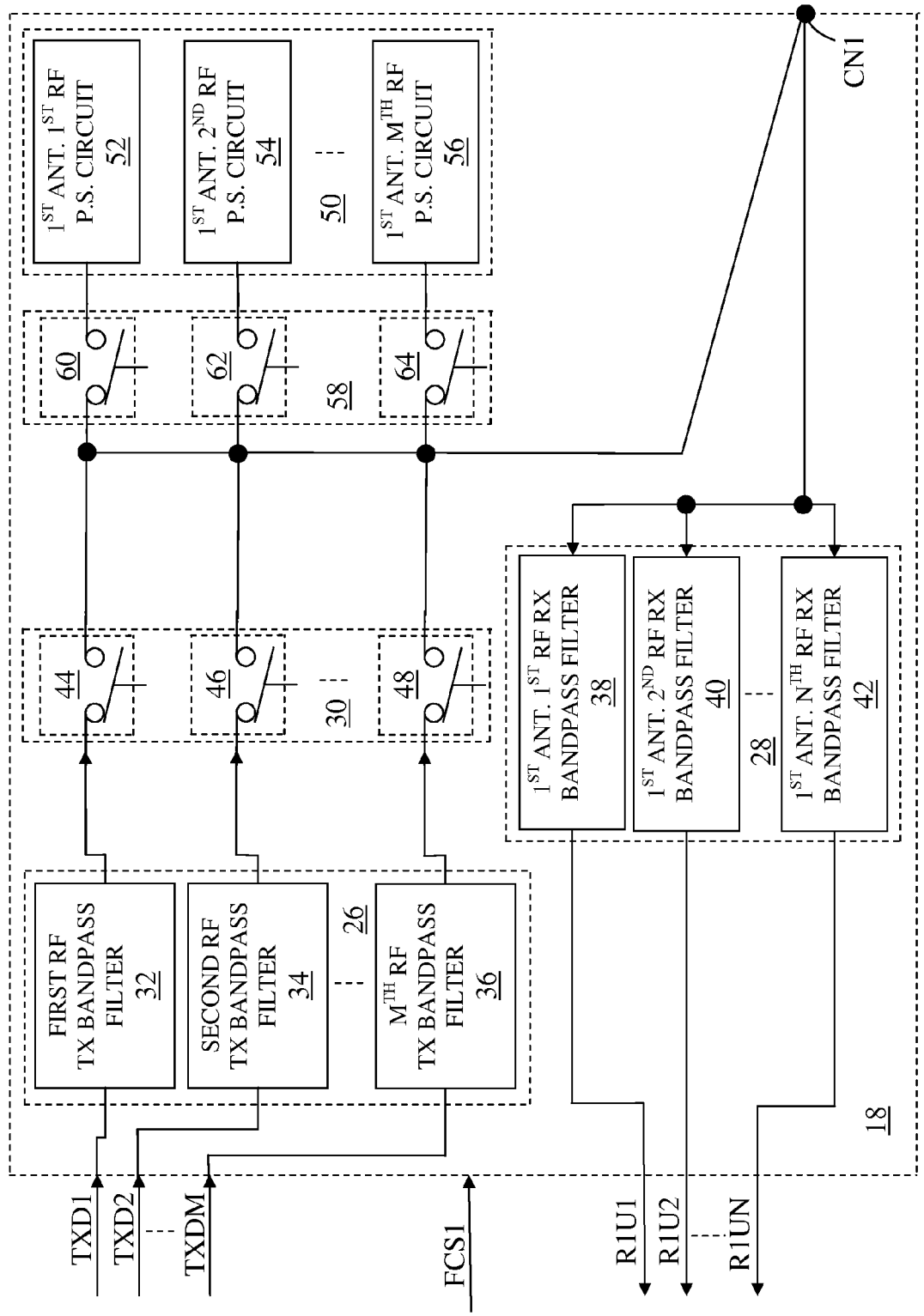
FIG. 5 shows details of the configurable RF TX/RX multiplexer illustrated in FIG. 1 according to an additional embodiment of the configurable RF TX/RX multiplexer.

FIG. 5 shows details of the configurable RF TX/RX multiplexer 18 illustrated in FIG. 1 according to an additional embodiment of the configurable RF TX/RX multiplexer 18. The configurable RF TX/RX multiplexer 18 illustrated in FIG. 5 is similar to the configurable RF TX/RX multiplexer 18 illustrated in FIG. 4, except the configurable RF TX/RX multiplexer 18 illustrated in FIG. 5 further includes a first group 58 of phase-shift switching elements.

The first group 58 of phase-shift switching elements includes a first antenna first phase-shift switching element 60, a first antenna second phase-shift switching element 62, and up to and including a first antenna $M^{TH}$ phase-shift switching element 64. Instead of the first group 50 of RF phase-shifting circuits being coupled between the group 26 of RF TX bandpass filters and the first group 30 of RF TX switching elements, as illustrated in FIG. 4, the first group 58 of phase-shift switching elements is coupled between the first group 50 of RF phase-shifting circuits and the first antenna port CN1. This architecture allows the first group 50 of RF phase-shifting circuits to be used during both receive only conditions and transmit only conditions, as might occur during time-division duplex (TDD) operations.

In general, each of the first group 58 of phase-shift switching elements is coupled between a corresponding one of the first group 50 of RF phase-shifting circuits and the first antenna port CN1, such that during transmission of the first RF antenna TX signal T1A (FIG. 1) via the first RF antenna 16 (FIG. 1), one of the group 26 of RF TX bandpass filters and a corresponding one of the first group 50 of RF phase-shifting circuits are operationally coupled to the first RF antenna 16 (FIG. 1).

Specifically, the first antenna first phase-shift switching element 60 is coupled between the first antenna first RF phase-shifting circuit 52 and the first antenna port CN1. The first antenna second phase-shift switching element 62 is coupled between the first antenna second RF phase-shifting circuit 54 and the first antenna port CN1. The first antenna $M^{TH}$ phase-shift switching element 64 is coupled between the first antenna $M^{TH}$ RF phase-shifting circuit 56 and the first antenna port CN1. In general, each of the first group 58 of phase-shift switching elements is coupled between a corresponding one of the first group 50 of RF phase-shifting circuits and the first antenna port CN1.

In one embodiment of the configurable RF TX/RX multiplexer 18, during a TDD reception of one of the group of first antenna RF RX signals R1A1, R1A2, R1AN (FIG. 1) via the first RF antenna 16 (FIG. 1), one of the first group 50 of RF phase-shifting circuits is operationally coupled to the first RF antenna 16 (FIG. 1). In one embodiment of the configurable RF TX/RX multiplexer 18, at least two of the first group 28 of RF RX bandpass filters simultaneously receive and filter a corresponding group of the first antenna RF RX signals R1A1, R1A2, R1AN (FIG. 1) to provide a corresponding group of first antenna, upstream RF receive signals R1U1, R1U2, R1UN.

Figure 6:
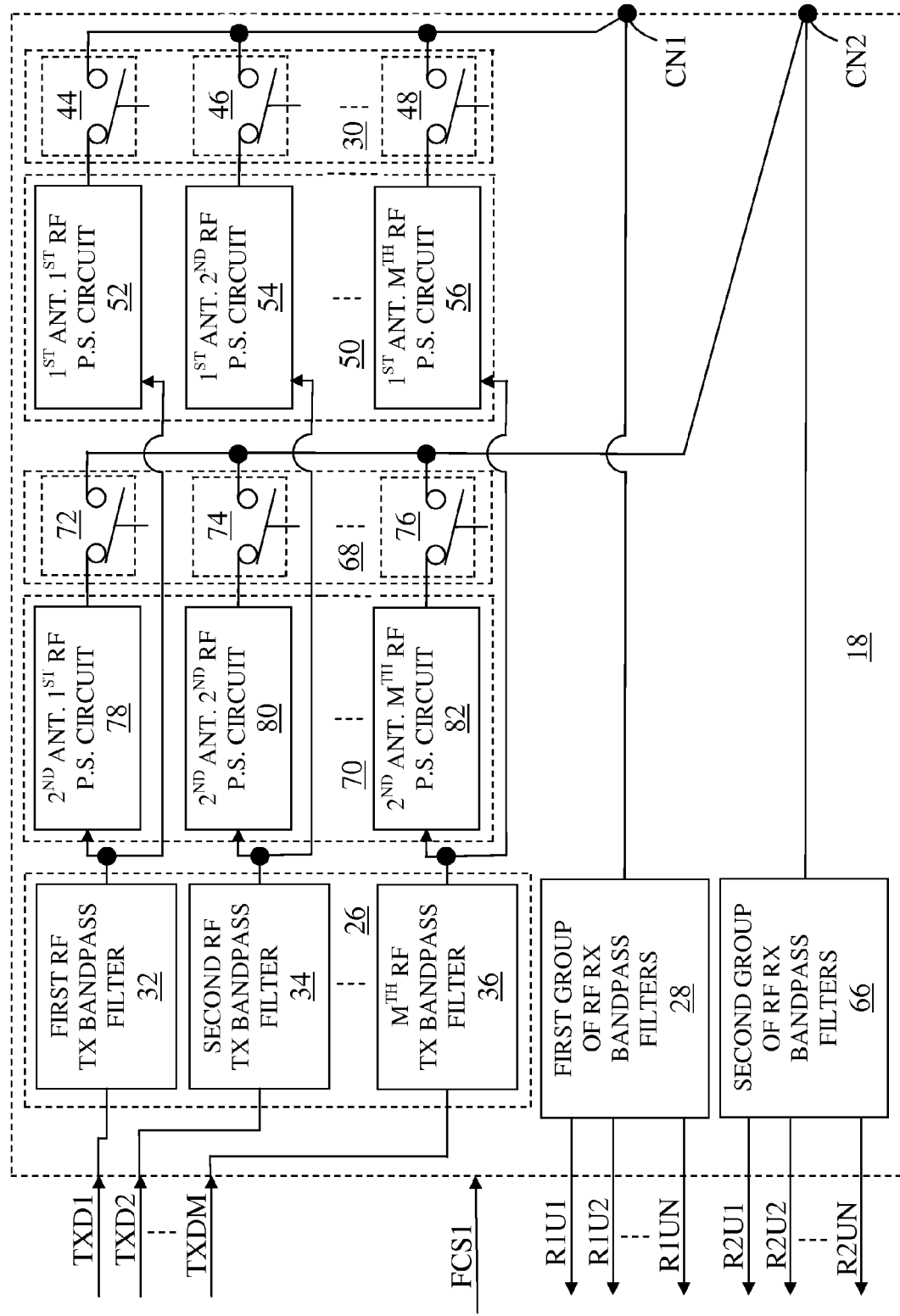
FIG. 6 shows details of the configurable RF TX/RX multiplexer illustrated in FIG. 2 according to one embodiment of the configurable RF TX/RX multiplexer.

FIG. 6 shows details of the configurable RF TX/RX multiplexer 18 illustrated in FIG. 2 according to one embodiment of the configurable RF TX/RX multiplexer 18. The configurable RF TX/RX multiplexer 18 illustrated in FIG. 6 is similar to the configurable RF TX/RX multiplexer 18 illustrated in FIG. 4, except the configurable RF TX/RX multiplexer 18 illustrated in FIG. 6 further includes a second group 66 of RF RX bandpass filters, a second group 68 of RF TX switching elements, and a second group 70 of RF phase-shifting circuits. In addition, the configurable RF TX/RX multiplexer 18 has the second antenna port CN2.

The second group 66 of RF RX bandpass filters is coupled to the second antenna port CN2. Specifically, each of the second group 66 of RF RX bandpass filters is coupled to the second antenna port CN2. The second group 68 of RF TX switching elements is coupled to the second antenna port CN2. The second group 70 of RF phase-shifting circuits is coupled between the group 26 of RF TX bandpass filters and the second group 68 of RF TX switching elements.

The second group 68 of RF TX switching elements includes a second antenna first RF TX switching element 72, a second antenna second RF TX switching element 74, and up to and including a second antenna $M^{TH}$ RF TX switching element 76. The second group 70 of RF phase-shifting circuits includes a second antenna first RF phase-shifting circuit 78, a second antenna second RF phase-shifting circuit 80, and up to and including a second antenna $M^{TH}$ RF phase-shifting circuit 82.

The second antenna first RF phase-shifting circuit 78 is coupled between the first RF TX bandpass filter 32 and the second antenna first RF TX switching element 72. The second antenna second RF phase-shifting circuit 80 is coupled between the second RF TX bandpass filter 34 and the second antenna second RF TX switching element 74. The second antenna $M^{TH}$ RF phase-shifting circuit 82 is coupled between the $M^{TH}$ RF TX bandpass filter 36 and the second antenna $M^{TH}$ RF TX switching element 76.

In general, each of the second group 70 of RF phase-shifting circuits is coupled between a corresponding one of the group 26 of RF TX bandpass filters and a corresponding one of the second group 68 of RF TX switching elements. In an alternate embodiment of the configurable RF TX/RX multiplexer 18, the second group 70 of RF phase-shifting circuits is omitted, such that each of the second group 68 of RF TX switching elements is coupled between a corresponding one of the group 26 of RF TX bandpass filters and the second antenna port CN2.

Figure 7:
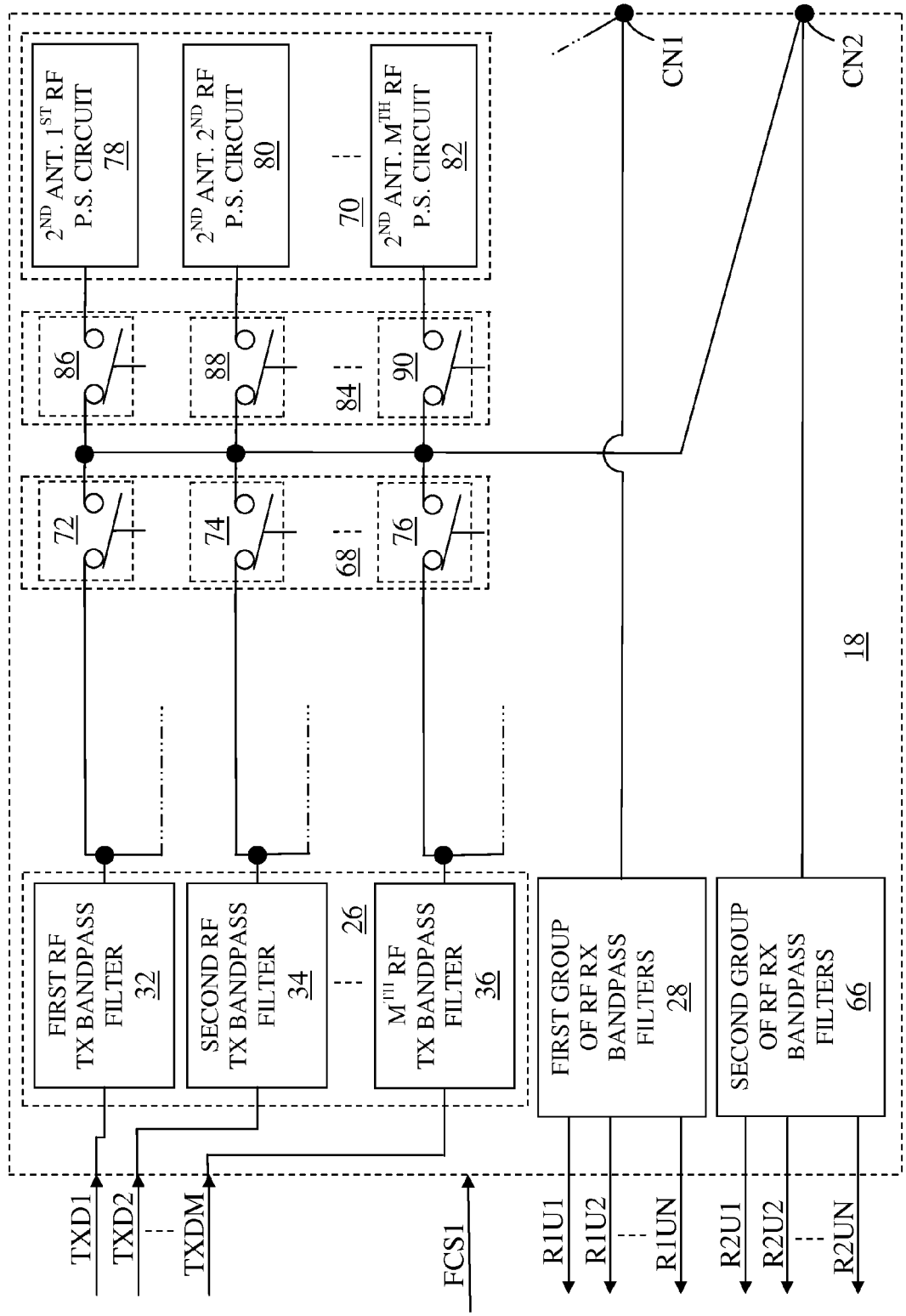
FIG. 7 shows details of the configurable RF TX/RX multiplexer illustrated in FIG. 2 according to an alternate embodiment of the configurable RF TX/RX multiplexer.

FIG. 7 shows details of the configurable RF TX/RX multiplexer 18 illustrated in FIG. 2 according to an alternate embodiment of the configurable RF TX/RX multiplexer 18. The configurable RF TX/RX multiplexer 18 illustrated in FIG. 7 includes the first group 30 of RF TX switching elements, the first group 50 of RF phase-shifting circuits, and the first group 58 of phase-shift switching elements configured as illustrated in FIG. 5. The first group 30 of RF TX switching elements, the first group 50 of RF phase-shifting circuits, and the first group 58 of phase-shift switching elements are not shown in FIG. 7 to simplify FIG. 7. Additionally, the configurable RF TX/RX multiplexer 18 illustrated in FIG. 7 further includes the second group 68 of RF TX switching elements, the second group 70 of RF phase-shifting circuits, and a second group 84 of phase-shift switching elements.

The second group 84 of phase-shift switching elements includes a second antenna first phase-shift switching element 86, a second antenna second phase-shift switching element 88, and up to and including a second antenna $M^{TH}$ phase-shift switching element 90. Each of the second group 68 of RF TX switching elements is coupled between a corresponding one of the group 26 of RF TX bandpass filters and the second antenna port CN2.

Each of the second group 84 of phase-shift switching elements is coupled between a corresponding one of the second group 70 of RF phase-shifting circuits and the second antenna port CN2. Specifically, the second antenna first phase-shift switching element 86 is coupled between the second antenna first RF phase-shifting circuit 78 and the second antenna port CN2. The second antenna second phase-shift switching element 88 is coupled between the second antenna second RF phase-shifting circuit 80 and the second antenna port CN2. The second antenna $M^{TH}$ phase-shift switching element 90 is coupled between the second antenna $M^{TH}$ RF phase-shifting circuit 82 and the second antenna port CN2.

Figure 8:
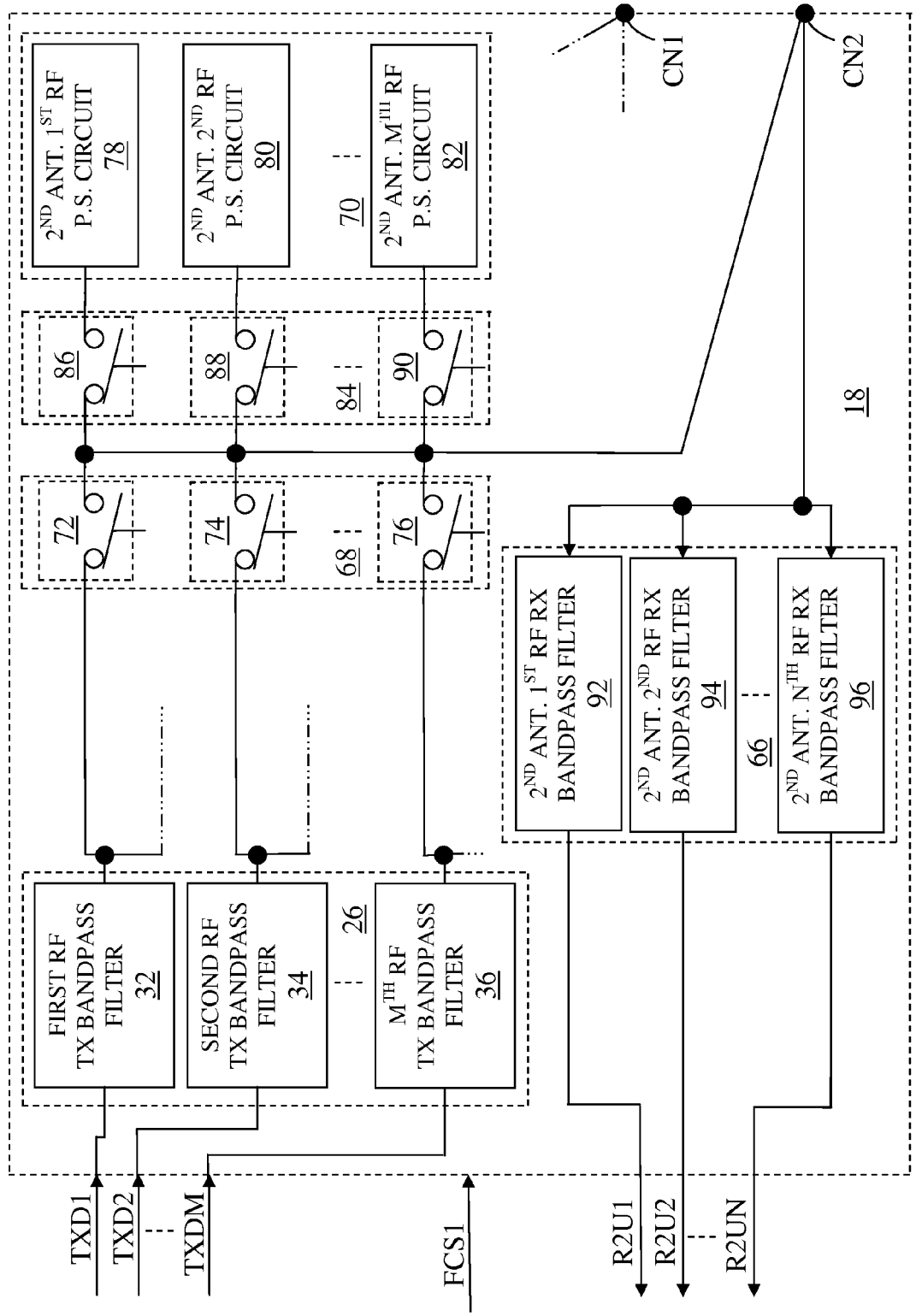
FIG. 8 shows details of the configurable RF TX/RX multiplexer illustrated in FIG. 2 according to an additional embodiment of the configurable RF TX/RX multiplexer.

FIG. 8 shows details of the configurable RF TX/RX multiplexer 18 illustrated in FIG. 2 according to an additional embodiment of the configurable RF TX/RX multiplexer 18. The configurable RF TX/RX multiplexer 18 illustrated in FIG. 8 is similar to the configurable RF TX/RX multiplexer 18 illustrated in FIG. 7, except in the configurable RF TX/RX multiplexer 18 illustrated in FIG. 8, the first group 28 of RF RX bandpass filters is not shown to simplify FIG. 8 and details of the second group 66 of RF RX bandpass filters are shown. The second group 66 of RF RX bandpass filters includes a second antenna first RF RX bandpass filter 92, a second antenna second RF RX bandpass filter 94, and up to and including a second antenna $N^{TH}$ RF RX bandpass filter 96.

In one embodiment of the second group 66 of RF RX bandpass filters, each of the second group 66 of RF RX bandpass filters is coupled to the second antenna port CN2. As such, the second antenna first RF RX bandpass filter 92 is coupled to the second antenna port CN2. The second antenna second RF RX bandpass filter 94 is coupled to the second antenna port CN2. The second antenna $N^{TH}$ RF RX bandpass filter 96 is coupled to the second antenna port CN2.

The second antenna first RF RX bandpass filter 92 receives and filters the second antenna, first RF receive signal R2A1 (FIG. 2) via the second antenna port CN2 to provide the second antenna, first upstream RF receive signal R2U1. The second antenna second RF RX bandpass filter 94 receives and filters the second antenna, second RF receive signal R2A2 (FIG. 2) via the second antenna port CN2 to provide the second antenna, second upstream RF receive signal R2U2. The second antenna $N^{TH}$ RF RX bandpass filter 96 receives and filters the second antenna, $N^{TH}$ RF receive signal R2AN (FIG. 2) via the second antenna port CN2 to provide the second antenna, $N^{TH}$ upstream RF receive signal R2UN. In general, the second group 66 of RF RX bandpass filters provides the first group of second antenna, upstream RF receive signals R2U1, R2U2, R2UN.

In an alternate embodiment of the second group 66 of RF RX bandpass filters, any of the second group 66 of RF RX bandpass filters are omitted. In one embodiment of the second group 66 of RF RX bandpass filters, each of the second group 66 of RF RX bandpass filters is directly coupled to the second antenna port CN2.

Figure 9:
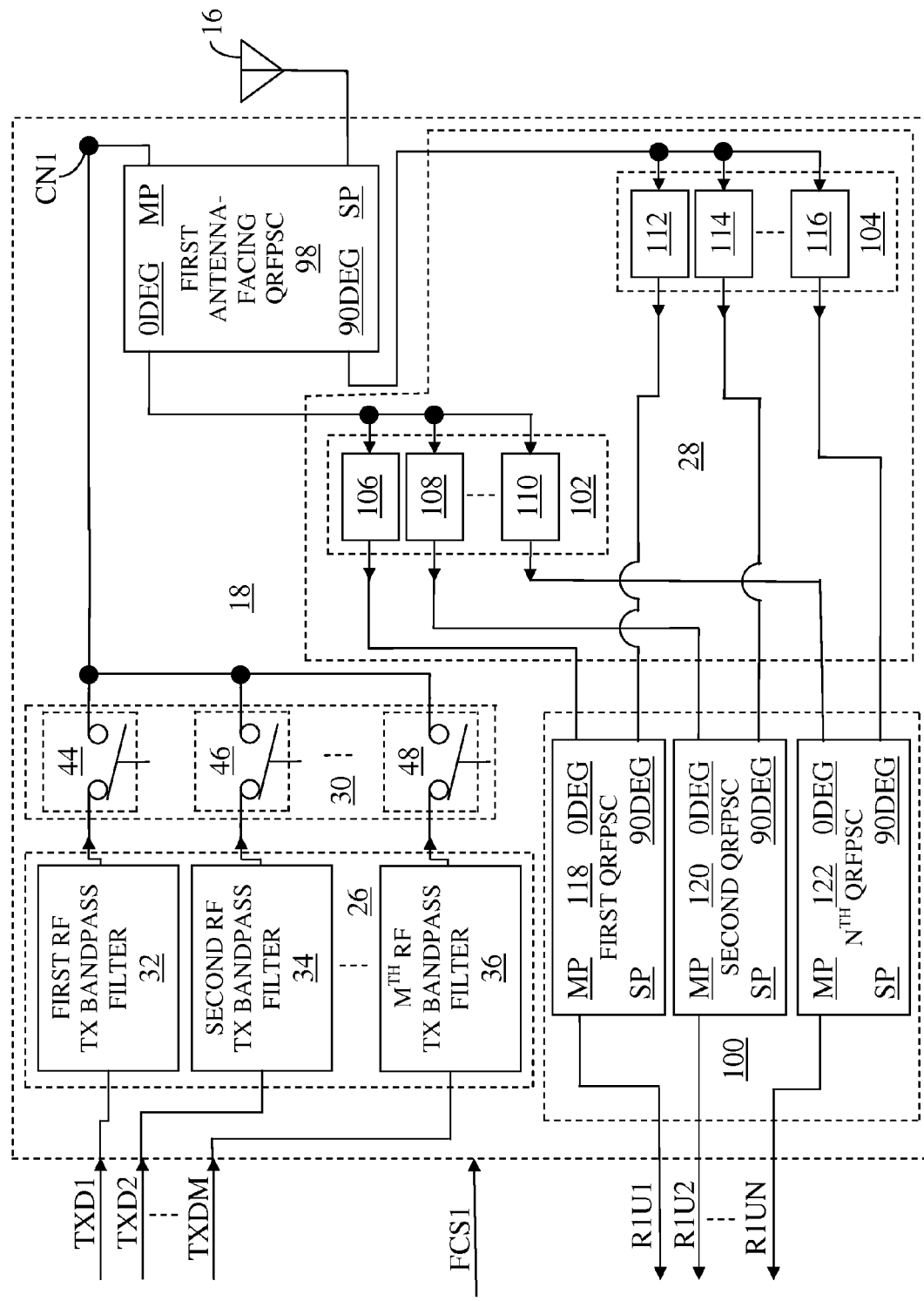
FIG. 9 shows details of the configurable RF TX/RX multiplexer illustrated in FIG. 1 and a first RF antenna according to one embodiment of the configurable RF TX/RX multiplexer and the first RF antenna.

FIG. 9 shows details of the configurable RF TX/RX multiplexer 18 illustrated in FIG. 1 and the first RF antenna 16 according to one embodiment of the configurable RF TX/RX multiplexer 18 and the first RF antenna 16. The configurable RF TX/RX multiplexer 18 includes the group 26 of RF TX bandpass filters, the first group 28 of RF RX bandpass filters, the first group 30 of RF TX switching elements, a first antenna-facing quadrature RF power splitter/combiner (QRFPSC) 98, and a first group 100 of QRFPSCs. Additionally, the configurable RF TX/RX multiplexer 18 has the first antenna port CN1. The group 26 of RF TX bandpass filters and the first group 30 of RF TX switching elements illustrated in FIG. 9 are similar to the group 26 of RF TX bandpass filters and the first group 30 of RF TX switching elements illustrated in FIG. 3. The first group 28 of RF RX bandpass filters includes a first group 102 of in-phase RF RX bandpass filters and a first group 104 of quadrature-phase RF RX bandpass filters.

The first group 102 of in-phase RF RX bandpass filters includes a first in-phase RF RX bandpass filter 106, a second in-phase RF RX bandpass filter 108, and up to and including an $N^{TH}$ in-phase RF RX bandpass filter 110. The first group 104 of quadrature-phase RF RX bandpass filters includes a first quadrature-phase RF RX bandpass filter 112, a second quadrature-phase RF RX bandpass filter 114, and up to and including an $N^{TH}$ quadrature-phase RF RX bandpass filter 116. The first group 100 of QRFPSCs includes a first QRFPSC 118, a second QRFPSC 120, and up to and including an $N^{TH}$ QRFPSC 122.

Each of the first antenna-facing QRFPSC 98 and the first group 100 of QRFPSCs includes a corresponding isolation port SP, main port MP, and pair of quadrature ports 0DEG, 90DEG. The pair of quadrature ports 0DEG, 90DEG includes an in-phase port 0DEG and a quadrature-phase port 90DEG. The first antenna-facing QRFPSC 98 is coupled between the first RF antenna 16 and the first antenna port CN1. The first antenna-facing QRFPSC 98 is further coupled between the first group 28 of RF RX bandpass filters and the first RF antenna 16. The first group 100 of QRFPSCs is coupled to the first group 28 of RF RX bandpass filters.

In one embodiment of the first antenna-facing QRFPSC 98 and the first group 100 of QRFPSCs, each of the first antenna-facing QRFPSC 98 and the first group 100 of QRFPSCs are hybrid RF couplers. In one embodiment of the first antenna-facing QRFPSC 98, the first antenna-facing QRFPSC 98 includes a corresponding group of acoustic-based RF resonators (ABRFR)s. In one embodiment of the first group 100 of QRFPSCs, each of the first group 100 of QRFPSCs includes a corresponding group of ABRFRs. In one embodiment of the first group 28 of RF RX bandpass filters, the first group 28 of RF RX bandpass filters includes a corresponding group of ABRFRs. In one embodiment of the second group 66 (FIG. 8) of RF receive bandpass filters, the second group 66 of RF RX bandpass filters (FIG. 8) includes a corresponding group of ABRFRs.

In one embodiment of the configurable RF TX/RX multiplexer 18, the first in-phase RF RX bandpass filter 106 is coupled between an in-phase port 0DEG of the first QRFPSC 118 and an in-phase port 0DEG of the first antenna-facing QRFPSC 98. The second in-phase RF RX bandpass filter 108 is coupled between an in-phase port 0DEG of the second QRFPSC 120 and the in-phase port 0DEG of the first antenna-facing QRFPSC 98. The $N^{TH}$ in-phase RF RX bandpass filter 110 is coupled between an in-phase port 0DEG of the $N^{TH}$ QRFPSC 122 and the in-phase port 0DEG of the first antenna-facing QRFPSC 98.

In one embodiment of the configurable RF TX/RX multiplexer 18, the first quadrature-phase RF RX bandpass filter 112 is coupled between a quadrature-phase port 90DEG of the first QRFPSC 118 and a quadrature-phase port 90DEG of the first antenna-facing QRFPSC 98. The second quadrature-phase RF RX bandpass filter 114 is coupled between a quadrature-phase port 90DEG of the second QRFPSC 120 and the quadrature-phase port 90DEG of the first antenna-facing QRFPSC 98. The $N^{TH}$ quadrature-phase RF RX bandpass filter 116 is coupled between a quadrature-phase port 90DEG of the $N^{TH}$ QRFPSC 122 and the quadrature-phase port 90DEG of the first antenna-facing QRFPSC 98.

In one embodiment of the first group 100 of QRFPSCs, the first QRFPSC 118 provides the first antenna, first upstream RF receive signal R1U1 via a main port MP of the first QRFPSC 118. The second QRFPSC 120 provides the first antenna, second upstream RF receive signal R1U2 via a main port MP of the second QRFPSC 120. The $N^{TH}$ QRFPSC 122 provides the first antenna, $N^{TH}$ upstream RF receive signal R1UN via a main port MP of the $N^{TH}$ QRFPSC 122.

In one embodiment of the first group 100 of QRFPSCs each of the first group 100 of QRFPSCs has a corresponding isolation port SP. As such, each corresponding isolation port SP of any or all of the first group 100 of QRFPSCs may be coupled to any or all of a corresponding group of resistive elements (not shown). Each of the corresponding group of resistive elements (not shown) may be coupled between a corresponding isolation port SP and ground.

Figure 10:
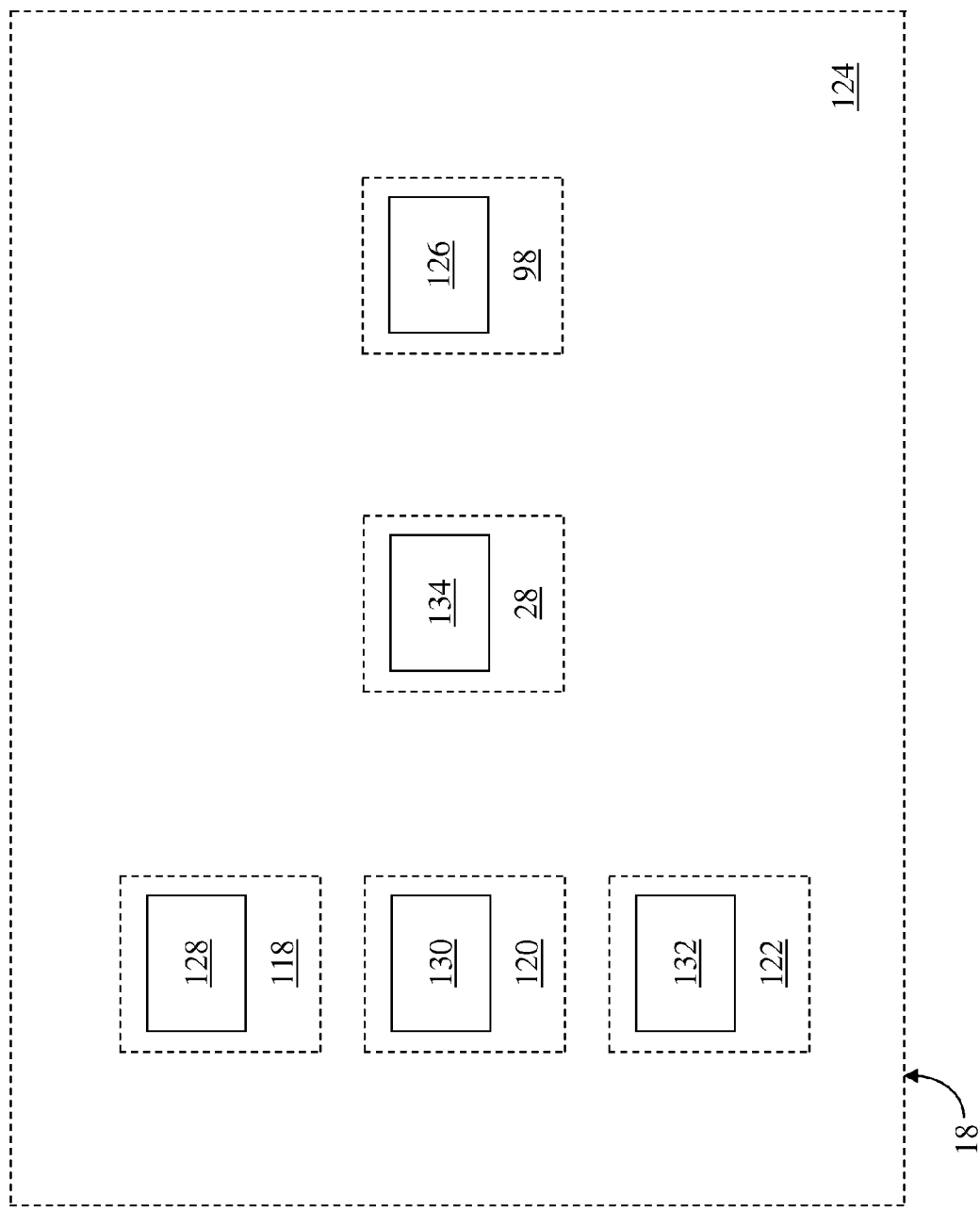
FIG. 10 shows details of the configurable RF TX/RX multiplexer illustrated in FIG. 9 according to one embodiment of the configurable RF TX/RX multiplexer.

FIG. 10 shows details of the configurable RF TX/RX multiplexer 18 illustrated in FIG. 9 according to one embodiment of the configurable RF TX/RX multiplexer 18. The configurable RF TX/RX multiplexer 18 illustrated in FIG. 10 includes an acoustic substrate 124. The acoustic substrate 124 includes the first group 28 of RF RX bandpass filters, the first antenna-facing QRFPSC 98, the first QRFPSC 118, the second QRFPSC 120, and the $N^{TH}$ QRFPSC 122.

The first antenna-facing QRFPSC 98 includes a first group of ABRFRs 126. The first QRFPSC 118 includes a second group of ABRFRs 128. The second QRFPSC 120 includes a third group of ABRFRs 130. The $N^{TH}$ QRFPSC 122 includes a fourth group of ABRFRs 132. The first group 28 of RF RX bandpass filters includes the fifth group of ABRFRs 134. In one embodiment of the first group of ABRFRs 126, the second group of ABRFRs 128, the third group of ABRFRs 130, the fourth group of ABRFRs 132, and the fifth group of ABRFRs 134, each of the first group of ABRFRs 126, the second group of ABRFRs 128, the third group of ABRFRs 130, the fourth group of ABRFRs 132, and the fifth group of ABRFRs 134 includes surface acoustic wave (SAW) RF circuitry.

In one embodiment of the first group of ABRFRs 126, the second group of ABRFRs 128, the third group of ABRFRs 130, the fourth group of ABRFRs 132, and the fifth group of ABRFRs 134, each of the first group of ABRFRs 126, the second group of ABRFRs 128, the third group of ABRFRs 130, the fourth group of ABRFRs 132, and the fifth group of ABRFRs 134 includes bulk acoustic wave (BAW) RF circuitry.

Figure 11A:
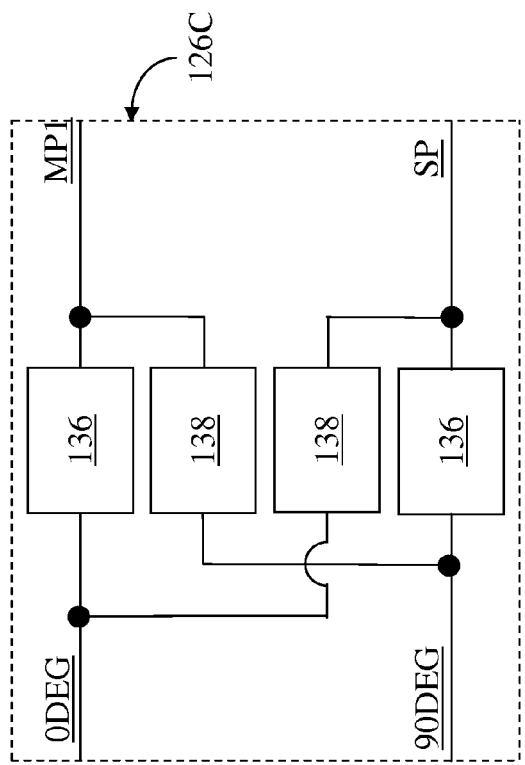
FIG. 11A shows details of a first group of acoustic-based RF resonators (ABRFR)s illustrated in FIG. 10 according to one embodiment of the first group of ABRFRs.

FIG. 11A shows details of the first group of ABRFRs 126 illustrated in FIG. 10 according to one embodiment of the first group of ABRFRs 126. The first group of ABRFRs 126 includes a pair of in-line coupled ABRFRs 136 and a pair of cross-coupled ABRFRs 138. One in-line coupled ABRFR 136 is coupled between the main port MP and the in-phase port 0DEG. Another in-line coupled ABRFR 136 is coupled between the isolation port SP and the quadrature-phase port 90DEG. One cross-coupled ABRFR 138 is coupled between the main port MP and the quadrature-phase port 90DEG. Another cross-coupled ABRFR 138 is coupled between the isolation port SP and the in-phase port 0DEG.

Figure 11B:
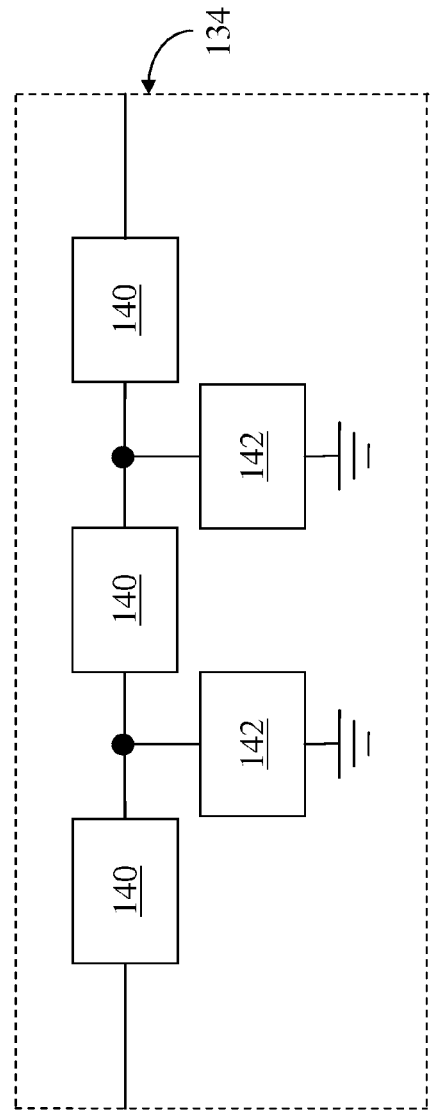
FIG. 11B shows details of a fifth group of ABRFRs illustrated in FIG. 10 according to one embodiment of the fifth group of ABRFRs.

FIG. 11B shows details of the fifth group of ABRFRs 134 illustrated in FIG. 10 according to one embodiment of the fifth group of ABRFRs 134. The fifth group of ABRFRs 134 includes multiple series-coupled ABRFRs 140 and multiple shunt-coupled ABRFRs 142. In general, two or more series-coupled ABRFRs 140 are coupled in series with one another. The series-coupled ABRFR 140s may be used to form multiple series couplings. In general, a shunt-coupled ABRFR 142 may be coupled between ground and a coupling between two series-coupled ABRFRs 140.

Figure 12:
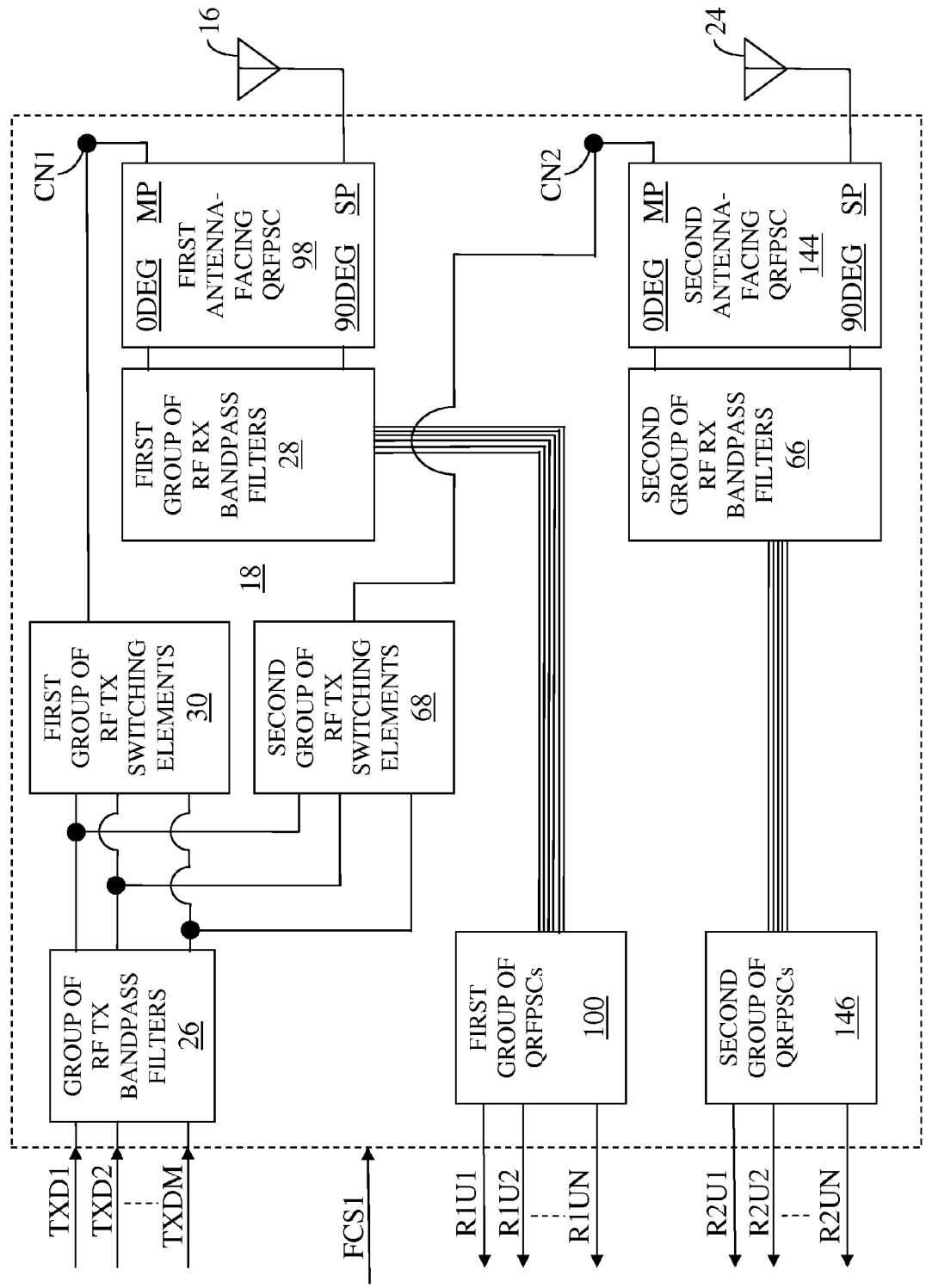
FIG. 12 shows details of the configurable RF TX/RX multiplexer illustrated in FIG. 2 according to one embodiment of the configurable RF TX/RX multiplexer.

FIG. 12 shows details of the configurable RF TX/RX multiplexer 18 illustrated in FIG. 2 according to one embodiment of the configurable RF TX/RX multiplexer 18. The configurable RF TX/RX multiplexer 18 illustrated in FIG. 12 is similar to the configurable RF TX/RX multiplexer 18 illustrated in FIG. 9, except the second RF antenna 24 is shown in FIG. 12 and the configurable RF TX/RX multiplexer 18 further includes the second group 66 of RF RX bandpass filters, the second group 68 of RF TX switching elements, a second antenna-facing QRFPSC 144, a second group 146 of QRFPSCs and the second antenna port CN2.

The second group 68 of RF TX switching elements is coupled between the group 26 of RF TX bandpass filters and the second antenna port CN2. As such, each of the second group 68 of RF TX switching elements is coupled between a corresponding one of the group 26 of RF TX bandpass filters and the second antenna port CN2. The second antenna-facing QRFPSC 144 is coupled between the second RF antenna 24 and the second antenna port CN2. In this regard, a main port MP of the second antenna-facing QRFPSC 144 is coupled to the second antenna port CN2 and an isolation port SP of the second antenna-facing QRFPSC 144 is coupled to the second RF antenna 24.

Additionally, the second antenna-facing QRFPSC 144 is coupled between the second group 66 of RF RX bandpass filters and the second RF antenna 24. Specifically, the second group 66 of RF RX bandpass filters is coupled to an in-phase port 0DEG and a quadrature-phase port 90DEG of the second antenna-facing QRFPSC 144. The second group 66 of RF RX bandpass filters is coupled to the second group 146 of QRFPSCs, which provides the second antenna, first upstream RF receive signal R2U1, the second antenna, second upstream RF receive signal R2U2, and up to and including the second antenna, $N^{TH}$ upstream RF receive signal R2UN.

Figure 13:
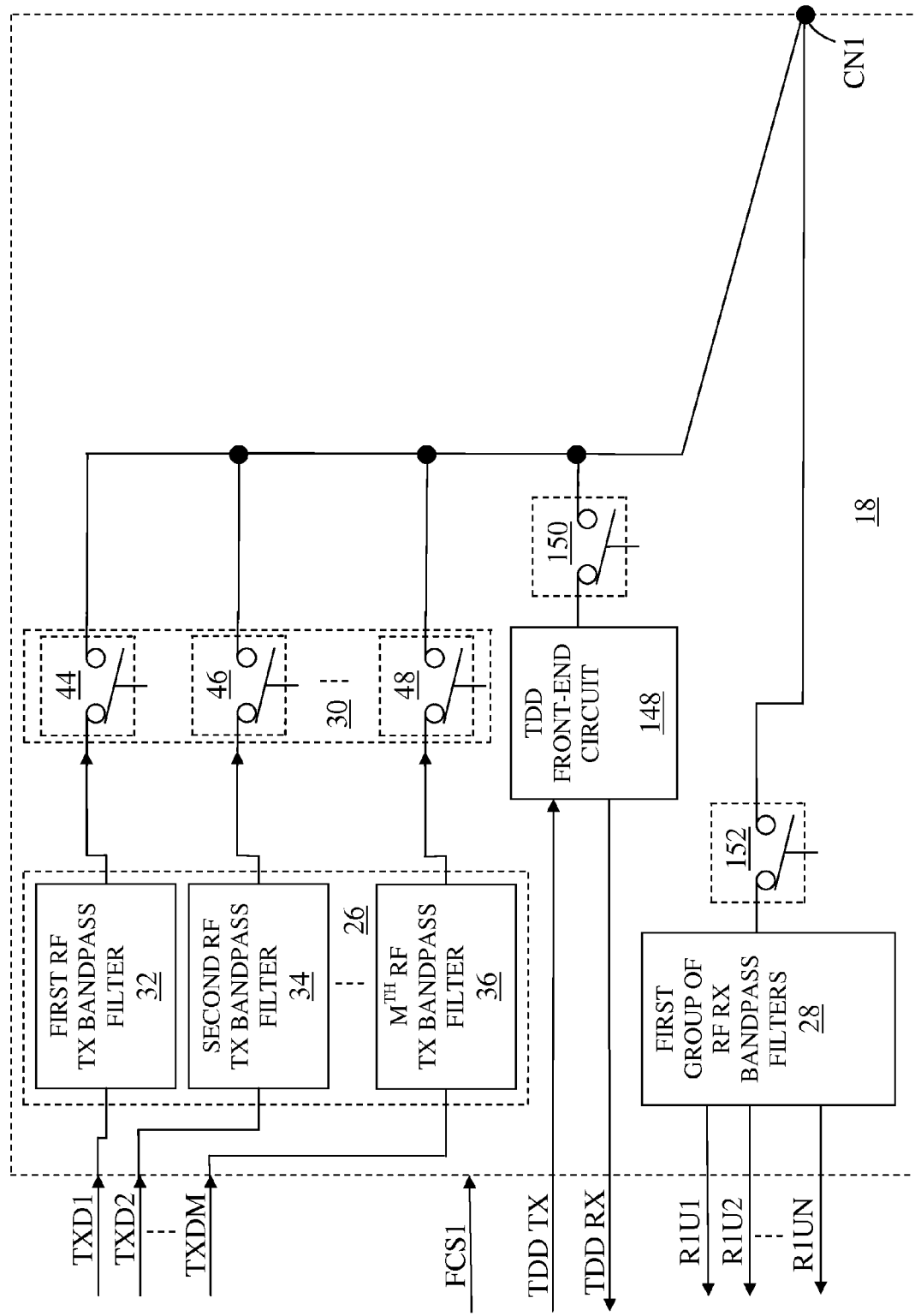
FIG. 13 shows details of the configurable RF TX/RX multiplexer illustrated in FIG. 1 according to one embodiment of the configurable RF TX/RX multiplexer.

FIG. 13 shows details of the configurable RF TX/RX multiplexer 18 illustrated in FIG. 1 according to one embodiment of the configurable RF TX/RX multiplexer 18. The configurable RF TX/RX multiplexer 18 illustrated in FIG. 13 is similar to the configurable RF TX/RX multiplexer 18 illustrated in FIG. 3, except the configurable RF TX/RX multiplexer 18 illustrated in FIG. 13 further includes a TDD front-end circuit 148, a TDD RF switching element 150, and a TDD RF RX switching element 152.

The TDD RF RX switching element 152 is coupled between the first antenna port CN1 and each of the first group 28 of RF RX bandpass filters. The TDD RF switching element 150 is coupled between the first antenna port CN1 and the TDD front-end circuit 148. The configurable RF TX/RX multiplexer 18 operates in one of a normal operating mode, a TDD receive mode, and a TDD transmit mode. During the normal operating mode, the TDD RF switching element 150 is OPEN and the TDD RF RX switching element 152 is CLOSED. As such, the TDD front-end circuit 148 does not significantly load the first antenna port CN1.

During the TDD receive mode, the TDD RF switching element 150 is CLOSED and the TDD RF RX switching element 152 is OPEN. By opening the TDD RF RX switching element 152, the first group 28 of RF RX bandpass filters is substantially isolated from the first antenna port CN1, thereby reducing insertion loss. Additionally, during the TDD receive mode, the TDD front-end circuit 148 provides a TDD RX signal TDD RX.

During the TDD transmit mode, the TDD RF switching element 150 is CLOSED and the TDD RF RX switching element 152 is OPEN. By opening the TDD RF RX switching element 152, the first group 28 of RF RX bandpass filters is substantially isolated from the first antenna port CN1, thereby reducing insertion loss. Additionally, during the TDD transmit mode, the TDD front-end circuit 148 receives and forwards a TDD TX signal TDD TX.

Figure 14:
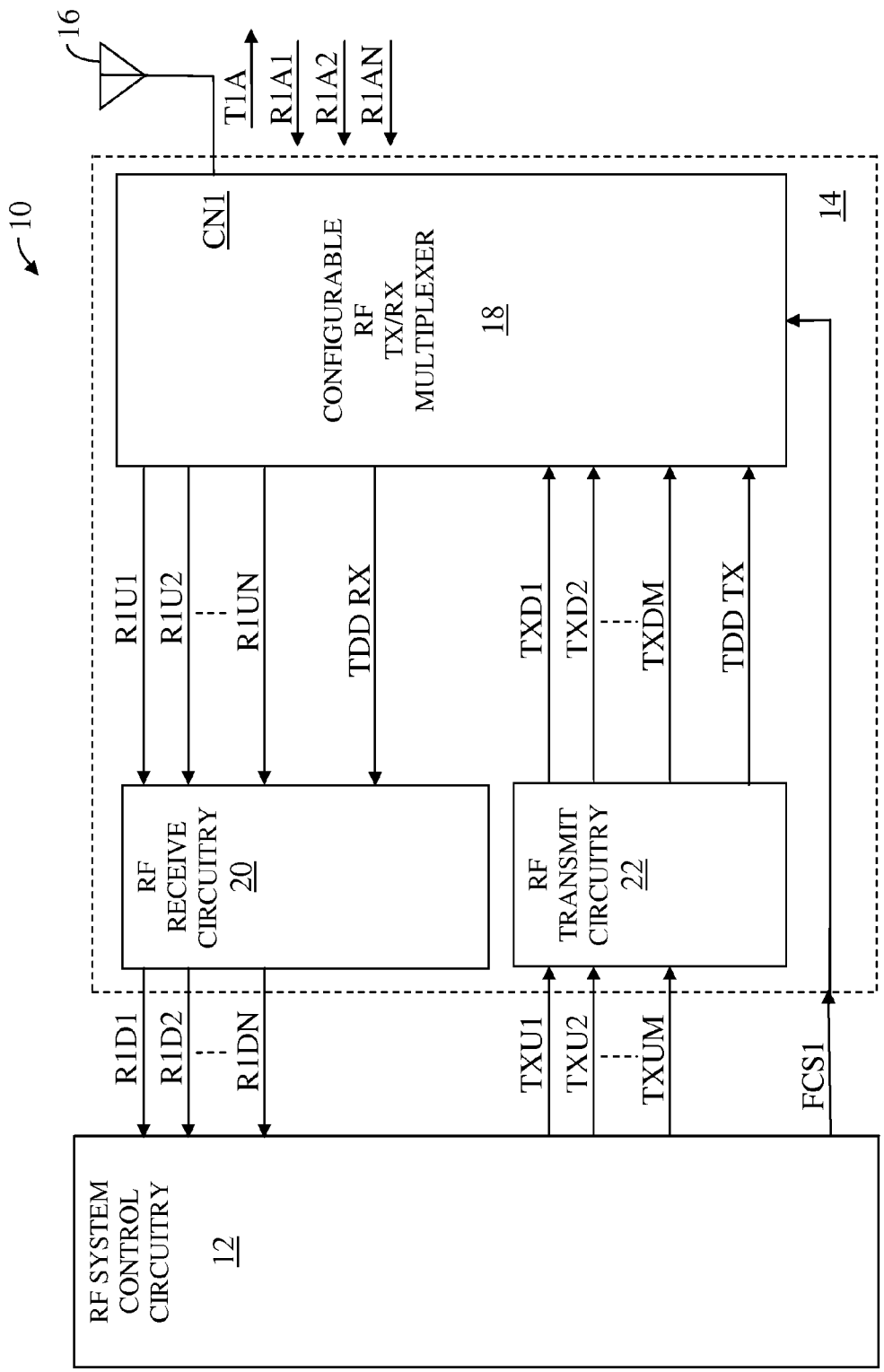
FIG. 14 shows the RF communications circuitry according to one embodiment of the RF communications circuitry.

FIG. 14 shows the RF communications circuitry 10 according to one embodiment of the RF communications circuitry 10. The RF communications circuitry 10 illustrated in FIG. 14 is similar to the RF communications circuitry 10 illustrated in FIG. 1, except in the RF communications circuitry 10 illustrated in FIG. 14; during the TDD transmit mode, the RF transmit circuitry 22 provides the TDD TX signal TDD TX to the configurable RF TX/RX multiplexer 18; and during the TDD receive mode, the configurable RF TX/RX multiplexer 18 provides the TDD RX signal TDD RX to the RF receive circuitry 20.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

Figure 15:
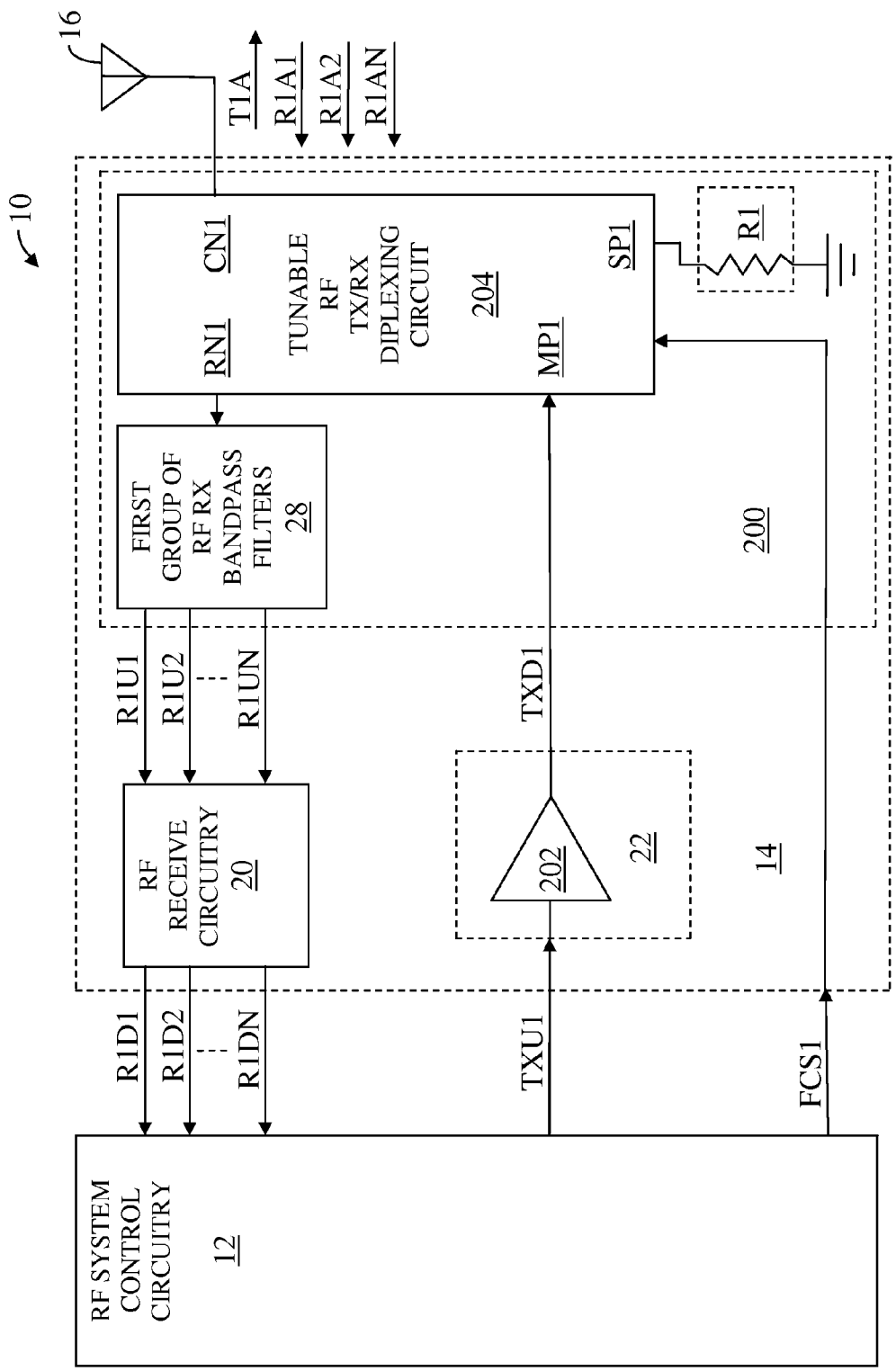
FIG. 15 shows the RF communications circuitry according to an alternate embodiment of the RF communications circuitry.

FIG. 15 shows the RF communications circuitry 10 according to an alternate embodiment of the RF communications circuitry 10. The RF communications circuitry 10 illustrated in FIG. 15 is similar to the RF communications circuitry 10 illustrated in FIG. 1, except in the RF communications circuitry 10 illustrated in FIG. 15, the configurable RF TX/RX multiplexer 18 is replaced with a tunable RF TX/RX multiplexer 200 and the RF transmit circuitry 22 includes an RF PA 202. Additionally, the second upstream RF TX signal TXU2 and up to and including the $M^{TH}$ upstream RF TX signal TXUM, and the second downstream RF TX signal TXD2 and up to and including the $M^{TH}$ upstream RF TX signal TXUM are omitted.

The tunable RF TX/RX multiplexer 200 includes the first group 28 of RF RX bandpass filters, a tunable RF TX/RX diplexing circuit 204, and a first resistive element R1. The tunable RF TX/RX diplexing circuit 204 has a first RX connection node RN1, a first antenna port CN1, a first main port MP1, and a first isolation port SP1. The first resistive element R1 is coupled between the first isolation port SP1 and ground. The first antenna port CN1 is coupled to the first RF antenna 16. The first RX connection node RN1 is coupled to each of the first group 28 of RF RX bandpass filters. The first main port MP1 is coupled to an output from the RF PA 202.

The RF PA 202 receives and amplifies the first upstream RF TX signal TXU1 to provide the first downstream RF TX signal TXD1 to the tunable RF TX/RX diplexing circuit 204 via the first main port MP1. The tunable RF TX/RX diplexing circuit 204 receives and filters the first downstream RF TX signal TXD1 via the first main port MP1 to provide the first RF antenna TX signal T1A to the first RF antenna 16 via the first antenna port CN1.

In one embodiment of the RF system control circuitry 12, the RF system control circuitry 12 may vary a carrier frequency of the first upstream RF TX signal TXU1 to meet communications needs. As such, circuit characteristics of the tunable RF TX/RX diplexing circuit 204 may need to be adjusted, or tuned, based on the carrier frequency of the first upstream RF TX signal TXU1. In this regard, the RF system control circuitry 12 provides the first function configuration signal FCS1 to the tunable RF TX/RX diplexing circuit 204. The RF system control circuitry 12 may adjust the circuit characteristics of the tunable RF TX/RX diplexing circuit 204 as needed using the first function configuration signal FCS1.

In one embodiment of the tunable RF TX/RX diplexing circuit 204, the tunable RF TX/RX diplexing circuit 204 receives any or all of the group of first antenna RF RX signals R1A1, R1A2, R1AN from the first RF antenna 16 via the first antenna port CN1. In one embodiment of the group of first antenna RF RX signals R1A1, R1A2, R1AN; any or all of the group of first antenna RF RX signals R1A1, R1A2, R1AN are received simultaneously, such that the any or all of the group of first antenna RF RX signals R1A1, R1A2, R1AN are RXDLCA RF signals.

The tunable RF TX/RX diplexing circuit 204 processes the any or all of the group of first antenna RF RX signals R1A1, R1A2, R1AN to provide respective RF input signals to the first group 28 of RF RX bandpass filters via the first RX connection node RN1. The first group 28 of RF RX bandpass filters receives and filters the respective RF input signals to provide any or all of the group of first antenna, upstream RF receive signals R1U1, R1U2, R1UN, which are respective filtered RF input signals. In one embodiment of the first group 28 of RF RX bandpass filters, at least two of the first group 28 of RF RX bandpass filters simultaneously receive and filter the respective RF input signals via the first RX connection node RN1.

Figure 16:
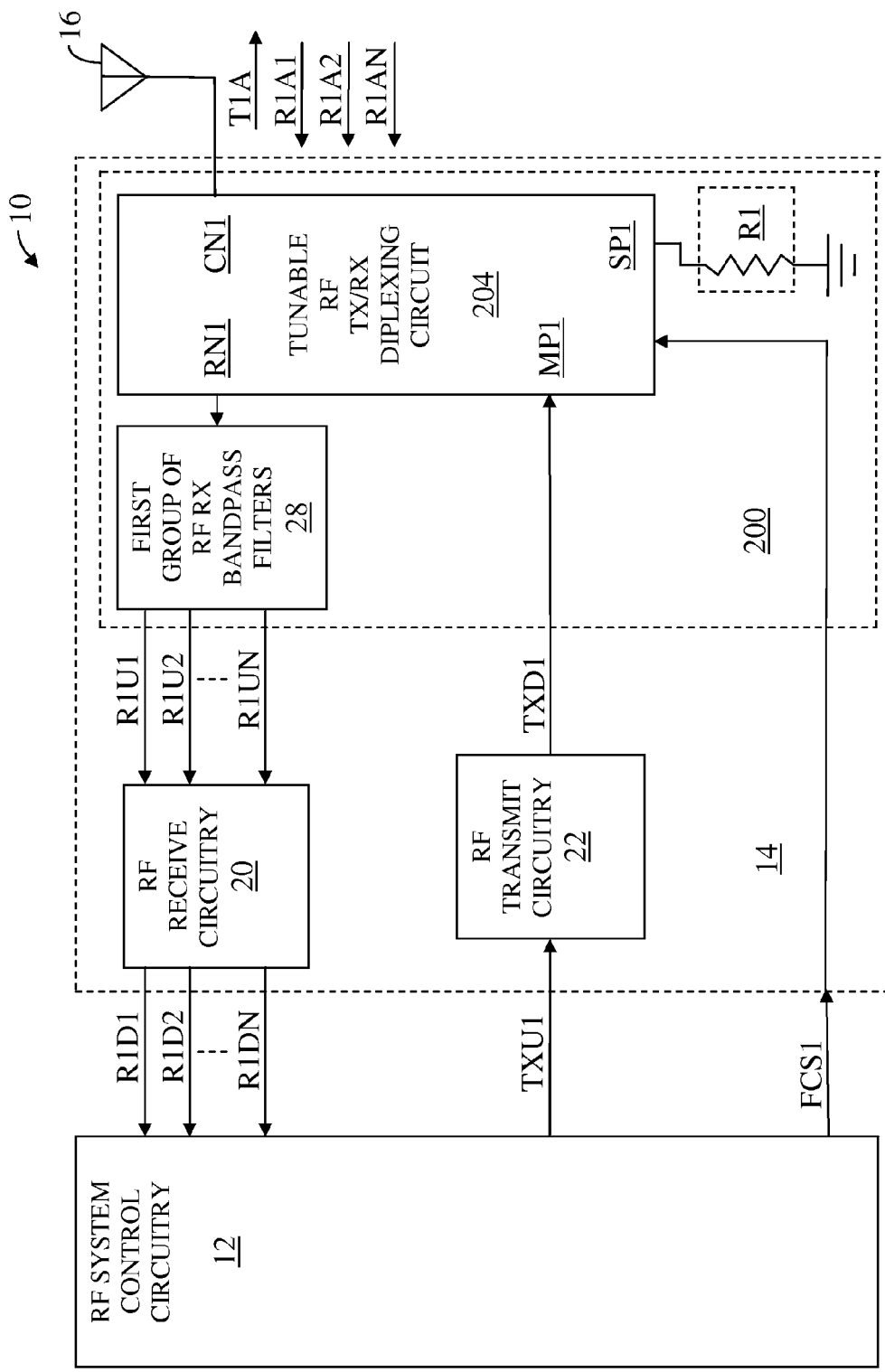
FIG. 16 shows the RF communications circuitry according to an additional embodiment of the RF communications circuitry.

FIG. 16 shows the RF communications circuitry 10 according to an additional embodiment of the RF communications circuitry 10. The RF communications circuitry 10 illustrated in FIG. 16 is similar to the RF communications circuitry 10 illustrated in FIG. 15, except in the RF communications circuitry 10 illustrated in FIG. 16, the RF PA 202 is omitted from the RF transmit circuitry 22. As such, in one embodiment of the RF transmit circuitry 22, the RF transmit circuitry 22 does not amplify the first upstream RF TX signal TXU1. In an alternate embodiment of the RF transmit circuitry 22, the RF transmit circuitry 22 partially amplifies the first upstream RF TX signal TXU1.

Figure 17:
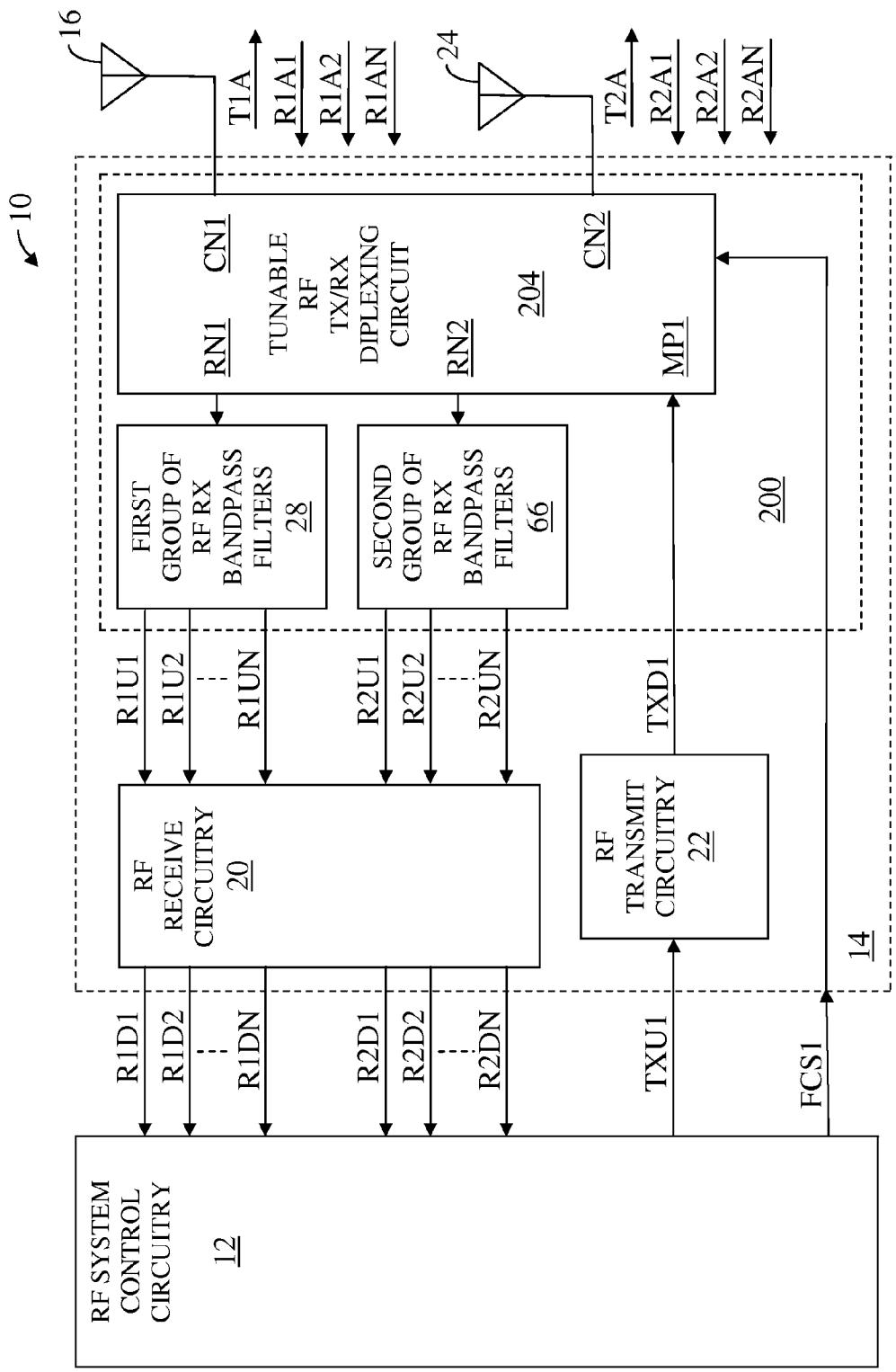
FIG. 17 shows the RF communications circuitry according to another embodiment of the RF communications circuitry.

FIG. 17 shows the RF communications circuitry 10 according to another embodiment of the RF communications circuitry 10. The RF communications circuitry 10 illustrated in FIG. 17 is similar to the RF communications circuitry 10 illustrated in FIG. 16, except the RF communications circuitry 10 illustrated in FIG. 17 further includes the second RF antenna 24 and the tunable RF TX/RX multiplexer 200 illustrated in FIG. 17 further includes the second group 66 of RF RX bandpass filters. The tunable RF TX/RX diplexing circuit 204 further has a second antenna port CN2 and a second RX connection node RN2.

The second antenna port CN2 is coupled to the second RF antenna 24. Each of the second group 66 of RF RX bandpass filters is coupled to the second RX connection node RN2. The RF receive circuitry 20 illustrated in FIG. 17 is similar to the RF receive circuitry 20 illustrated in FIG. 2.

In one embodiment of the tunable RF TX/RX diplexing circuit 204, the tunable RF TX/RX diplexing circuit 204 receives any or all of the group of second antenna RF RX signals R2A1, R2A2, R2AN from the second RF antenna 24 via the second antenna port CN2. In one embodiment of the group of first antenna RF RX signals R1A1, R1A2, R1AN and the group of second antenna RF RX signals R2A1, R2A2, R2AN; any or all of the group of first antenna RF RX signals R1A1, R1A2, R1AN and the group of second antenna RF RX signals R2A1, R2A2, R2AN are received simultaneously, such that the any or all of the group of first antenna RF RX signals R1A1, R1A2, R1AN and the group of second antenna RF RX signals R2A1, R2A2, R2AN are RXDLCA RF signals.

In one embodiment of the tunable RF TX/RX diplexing circuit 204, the tunable RF TX/RX diplexing circuit 204 receives and processes any or all of the group of first antenna RF RX signals R1A1, R1A2, R1AN and the group of second antenna RF RX signals R2A1, R2A2, R2AN to provide respective RF input signals to the first group 28 of RF RX bandpass filters and the second group 66 of RF RX bandpass filters.

The first group 28 of RF RX bandpass filters and the second group 66 of RF RX bandpass filters receive and filter the respective RF input signals to provide any or all of the group of first antenna, upstream RF receive signals R1U1, R1U2, R1UN and the group of second antenna, upstream RF receive signals R2U1, R2U2, R2UN, which are respective filtered RF input signals. In one embodiment of the first group 28 of RF RX bandpass filters and the second group 66 of RF RX bandpass filters, at least two of the first group 28 of RF RX bandpass filters and the second group 66 of RF RX bandpass filters simultaneously receive and filter the respective RF input signals via the first RX connection node RN1 and the second RX connection node RN2.

Figure 18:
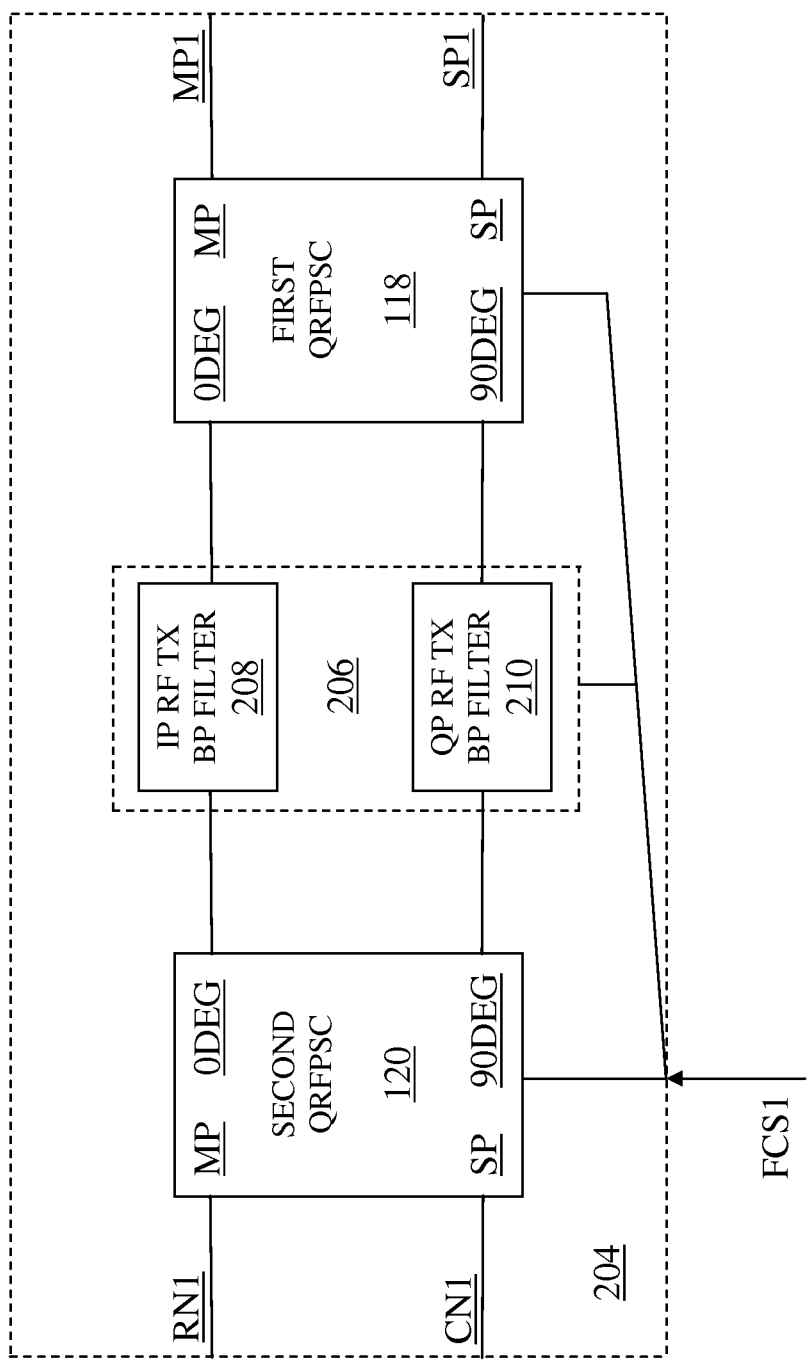
FIG. 18 shows a tunable RF TX/RX diplexing circuit illustrated in FIG. 15 according to one embodiment of the tunable RF TX/RX diplexing circuit.

FIG. 18 shows the tunable RF TX/RX diplexing circuit 204 illustrated in FIG. 15 according to one embodiment of the tunable RF TX/RX diplexing circuit 204. The tunable RF TX/RX diplexing circuit 204 includes the first QRFPSC 118, the second QRFPSC 120, and a tunable quadrature RF TX filter 206, which includes an in-phase RF TX bandpass filter 208 and a quadrature-phase RF TX bandpass filter 210. Additionally, the tunable RF TX/RX diplexing circuit 204 has the first RX connection node RN1, the first antenna port CN1, the first isolation port SP1, and the first main port MP1.

The main port MP of the second QRFPSC 120 is coupled to the first RX connection node RN1. The isolation port SP of the second QRFPSC 120 is coupled to the first antenna port CN1. The main port MP of the first QRFPSC 118 is coupled to the first main port MP1. The isolation port SP of the first QRFPSC 118 is coupled to the first isolation port SP1. The in-phase RF TX bandpass filter 208 is coupled between the in-phase port 0DEG of the first QRFPSC 118 and the in-phase port 0DEG of the second QRFPSC 120. The quadrature-phase RF TX bandpass filter 210 is coupled between the quadrature-phase port 90DEG of the first QRFPSC 118 and the quadrature-phase port 90DEG of the second QRFPSC 120.

In general, the first QRFPSC 118 is coupled to the first main port MP1 and the first isolation port SP1. The second QRFPSC 120 is coupled to the first RX connection node RN1 and the first antenna port CN1. The tunable quadrature RF TX filter 206 is coupled between the first QRFPSC 118 and the second QRFPSC 120.

In a first exemplary embodiment of the tunable RF TX/RX diplexing circuit 204, the tunable RF TX/RX diplexing circuit 204 receives the first downstream RF TX signal TXD1 (FIG. 15) via the first main port MP1. The first QRFPSC 118 receives, splits, and phase-shifts the first downstream RF TX signal TXD1 (FIG. 15) to provide a pair of quadrature RF signals to the tunable quadrature RF TX filter 206 via the in-phase port 0DEG and the quadrature-phase port 90DEG of the first QRFPSC 118. The tunable quadrature RF TX filter 206 receives, filters, and forwards the pair of quadrature RF signals to the in-phase port 0DEG and the quadrature-phase port 90DEG of the second QRFPSC 120, which receives, phase-shifts, and combines the filtered pair of quadrature RF signals to provide the first RF antenna TX signal T1A (FIG. 15) via the main port MP of the second QRFPSC 120 and the first antenna port CN1.

In a second exemplary embodiment of the tunable RF TX/RX diplexing circuit 204, the tunable RF TX/RX diplexing circuit 204 receives the first antenna, first RF receive signal R1A1 (FIG. 15) via the first antenna port CN1. The second QRFPSC 120 receives, splits, and phase-shifts the first antenna, first RF receive signal R1A1 (FIG. 15) to provide a pair of quadrature RF signals to the tunable quadrature RF TX filter 206 via the in-phase port 0DEG and the quadrature-phase port 90DEG of the second QRFPSC 120. The tunable quadrature RF TX filter 206 essentially reflects the pair of quadrature RF signals to the in-phase port 0DEG and the quadrature-phase port 90DEG of the second QRFPSC 120, which receives, phase-shifts, and combines the reflected pair of quadrature RF signals to provide an RF receive signal to the first group 28 (FIG. 15) of RF RX bandpass filters via the first RX connection node RN1.

Since the carrier frequency of the first downstream RF TX signal TXD1 (FIG. 15) may vary, the tunable quadrature RF TX filter 206 is tunable, such that a bandpass center frequency of the tunable quadrature RF TX filter 206 is tunable. In one embodiment of the tunable quadrature RF TX filter 206, the bandpass center frequency of the tunable quadrature RF TX filter 206 is based on the first function configuration signal FCS1.

In one embodiment of the first QRFPSC 118, splitting and combining characteristics of the first QRFPSC 118 are tunable, such that the splitting and combining characteristics of the first QRFPSC 118 are based on the first function configuration signal FCS1. In one embodiment of the second QRFPSC 120, splitting and combining characteristics of the second QRFPSC 120 are tunable, such that the splitting and combining characteristics of the second QRFPSC 120 are based on the first function configuration signal FCS1.

Figure 19:
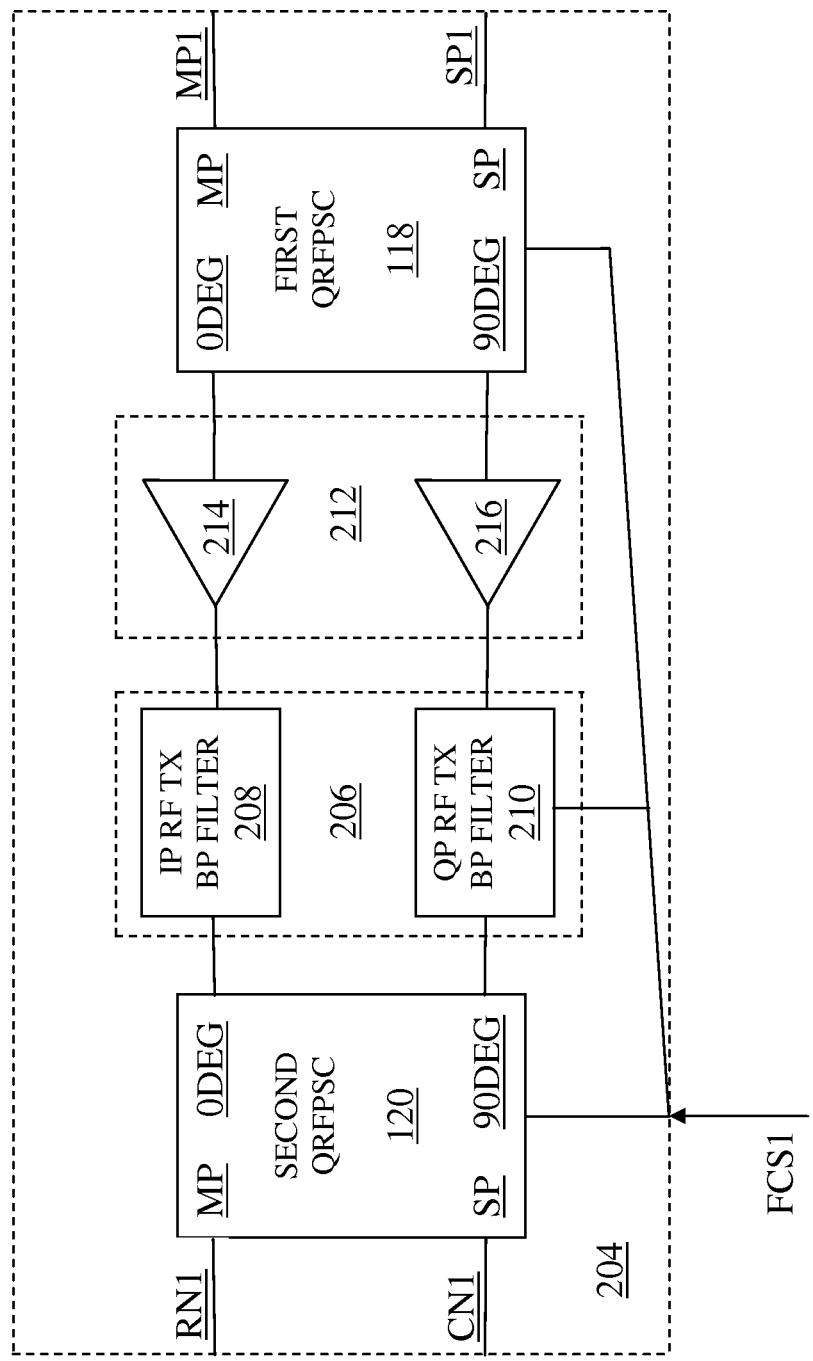
FIG. 19 shows the tunable RF TX/RX diplexing circuit illustrated in FIG. 16 according to an alternate embodiment of the tunable RF TX/RX diplexing circuit.

FIG. 19 shows the tunable RF TX/RX diplexing circuit 204 illustrated in FIG. 16 according to an alternate embodiment of the tunable RF TX/RX diplexing circuit 204. The tunable RF TX/RX diplexing circuit 204 illustrated in FIG. 19 is similar to the tunable RF TX/RX diplexing circuit 204 illustrated in FIG. 18, except the tunable RF TX/RX diplexing circuit 204 illustrated in FIG. 19 further includes a quadrature RF PA 212 coupled between the first QRFPSC 118 and the tunable quadrature RF TX filter 206.

As such, the quadrature RF PA 212 includes an in-phase RF PA 214 and a quadrature-phase RF PA 216. The in-phase RF PA 214 is coupled between the in-phase port 0DEG of the first QRFPSC 118 and the in-phase RF TX bandpass filter 208. The quadrature-phase RF PA 216 is coupled between the quadrature-phase port 90DEG of the first QRFPSC 118 and the quadrature-phase RF TX bandpass filter 210. The quadrature RF PA 212 receives and amplifies a pair of quadrature RF signals from the first QRFPSC 118 to provide an amplified pair of RF signals to the tunable quadrature RF TX filter 206.

Figure 20:
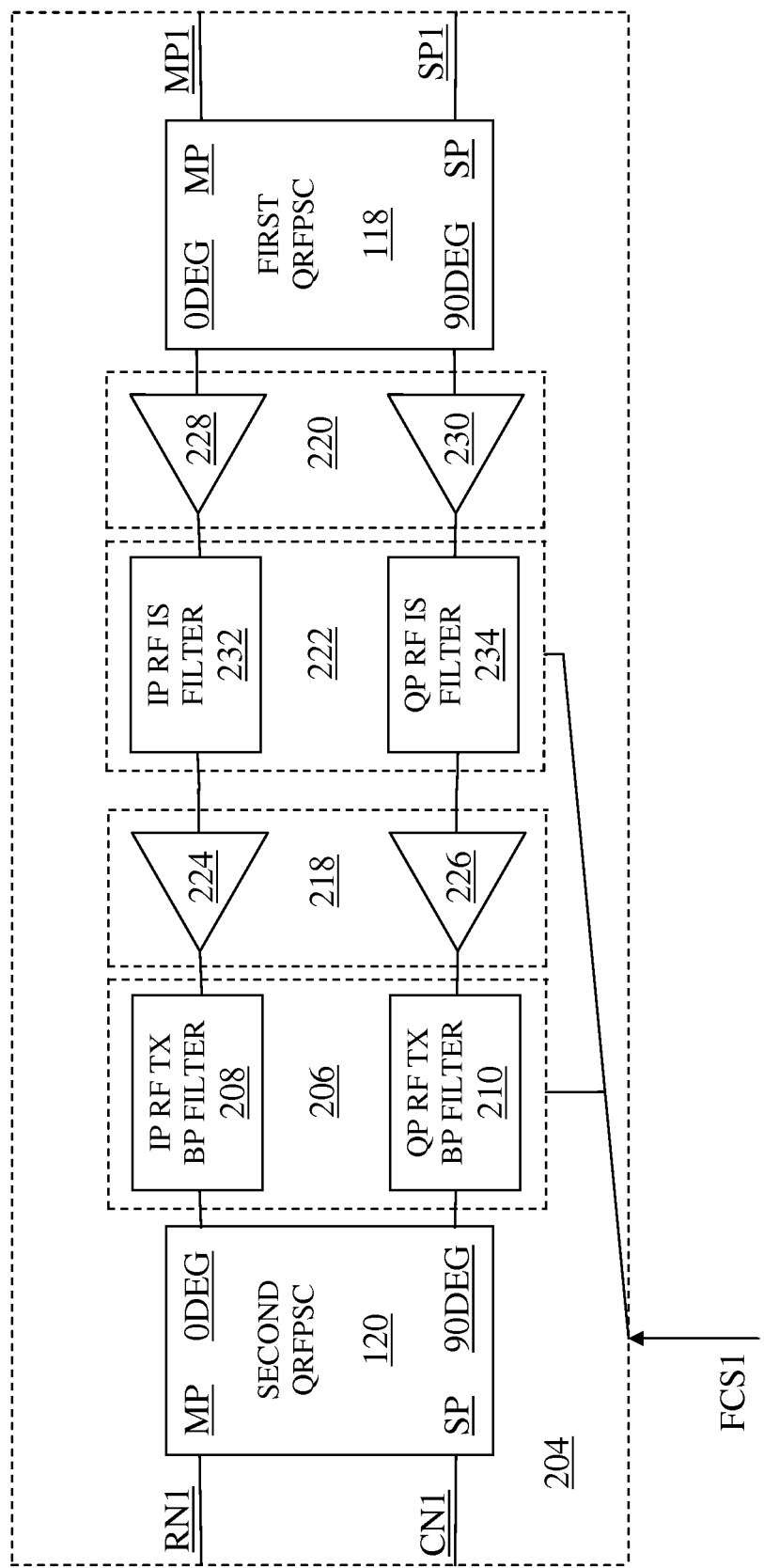
FIG. 20 shows the tunable RF TX/RX diplexing circuit illustrated in FIG. 16 according to an additional embodiment of the tunable RF TX/RX diplexing circuit.

FIG. 20 shows the tunable RF TX/RX diplexing circuit 204 illustrated in FIG. 16 according to an additional embodiment of the tunable RF TX/RX diplexing circuit 204. The tunable RF TX/RX diplexing circuit 204 illustrated in FIG. 20 is similar to the tunable RF TX/RX diplexing circuit 204 illustrated in FIG. 18, except the tunable RF TX/RX diplexing circuit 204 illustrated in FIG. 19 further includes a quadrature RF PA output stage 218, a quadrature RF PA driver stage 220, and a tunable quadrature RF interstage filter 222.

In general, the quadrature RF PA driver stage 220, the tunable quadrature RF interstage filter 222, the quadrature RF PA output stage 218, and the in-phase RF TX bandpass filter 208 are coupled in series between the first QRFPSC 118 and the second QRFPSC 120. Specifically, in one embodiment of the tunable RF TX/RX diplexing circuit 204, the tunable quadrature RF TX filter 206 is coupled between the second QRFPSC 120 and the quadrature RF PA output stage 218. The tunable quadrature RF interstage filter 222 is coupled between the quadrature RF PA output stage 218 and the quadrature RF PA driver stage 220. The quadrature RF PA driver stage 220 is coupled between the tunable quadrature RF interstage filter 222 and the first QRFPSC 118.

The quadrature RF PA output stage 218 includes an in-phase RF output stage 224 and a quadrature-phase RF output stage 226. The quadrature RF PA driver stage 220 includes an in-phase RF driver stage 228 and a quadrature-phase RF driver stage 230. The tunable quadrature RF interstage filter 222 includes an in-phase RF interstage filter 232 and a quadrature-phase RF interstage filter 234.

The in-phase RF TX bandpass filter 208 is coupled between the in-phase port 0DEG of the second QRFPSC 120 and the in-phase RF output stage 224. The in-phase RF interstage filter 232 is coupled between the in-phase RF output stage 224 and the in-phase RF driver stage 228. The in-phase RF driver stage 228 is coupled between the in-phase RF interstage filter 232 and the in-phase port 0DEG of the first QRFPSC 118.

The quadrature-phase RF TX bandpass filter 210 is coupled between the quadrature-phase port 90DEG of the second QRFPSC 120 and the quadrature-phase RF output stage 226. The quadrature-phase RF interstage filter 234 is coupled between the quadrature-phase RF output stage 226 and the quadrature-phase RF driver stage 230. The quadrature-phase RF driver stage 230 is coupled between the quadrature-phase RF interstage filter 234 and the quadrature-phase port 90DEG of the first QRFPSC 118.

Figure 21:
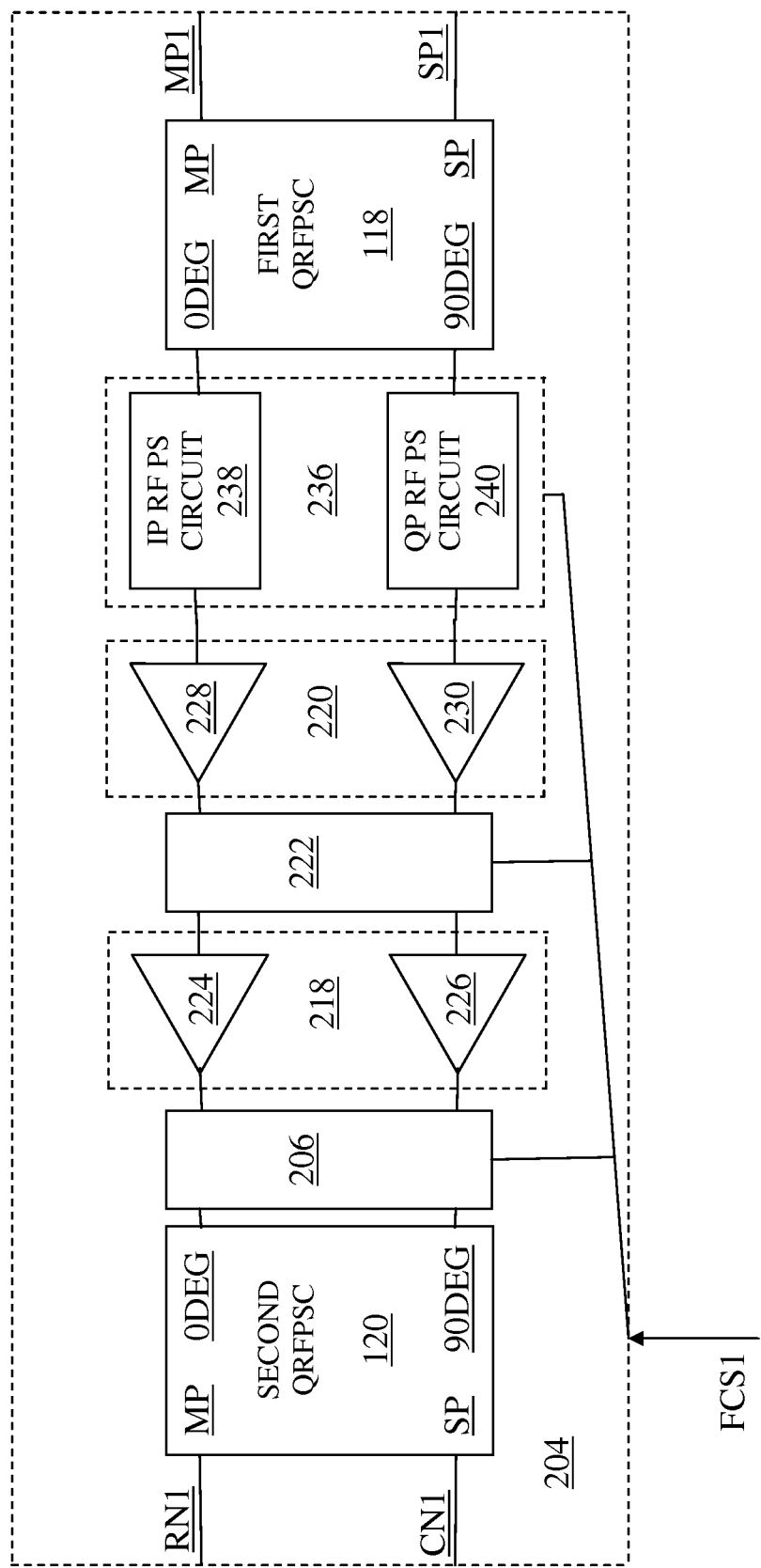
FIG. 21 shows the tunable RF TX/RX diplexing circuit illustrated in FIG. 16 according to another embodiment of the tunable RF TX/RX diplexing circuit.

FIG. 21 shows the tunable RF TX/RX diplexing circuit 204 illustrated in FIG. 16 according to another embodiment of the tunable RF TX/RX diplexing circuit 204. The tunable RF TX/RX diplexing circuit 204 illustrated in FIG. 21 is similar to the tunable RF TX/RX diplexing circuit 204 illustrated in FIG. 20, except the tunable RF TX/RX diplexing circuit 204 illustrated in FIG. 21 further includes a tunable quadrature RF phase-shifting circuit 236, which includes an in-phase RF phase-shifting circuit 238 and a quadrature-phase RF phase-shifting circuit 240.

In general, the tunable quadrature RF phase-shifting circuit 236, the quadrature RF PA driver stage 220, the tunable quadrature RF interstage filter 222, the quadrature RF PA output stage 218, and the tunable quadrature RF TX filter 206 are coupled in series between the first QRFPSC 118 and the second QRFPSC 120. Specifically, the tunable quadrature RF phase-shifting circuit 236 is coupled between the first QRFPSC 118 and the quadrature RF PA driver stage 220. As such, the in-phase RF phase-shifting circuit 238 is coupled between the in-phase port 0DEG of the first QRFPSC 118 and the in-phase RF driver stage 228. The quadrature-phase RF phase-shifting circuit 240 is coupled between the quadrature-phase port 90DEG of the first QRFPSC 118 and the quadrature-phase RF driver stage 230.

Figure 22:
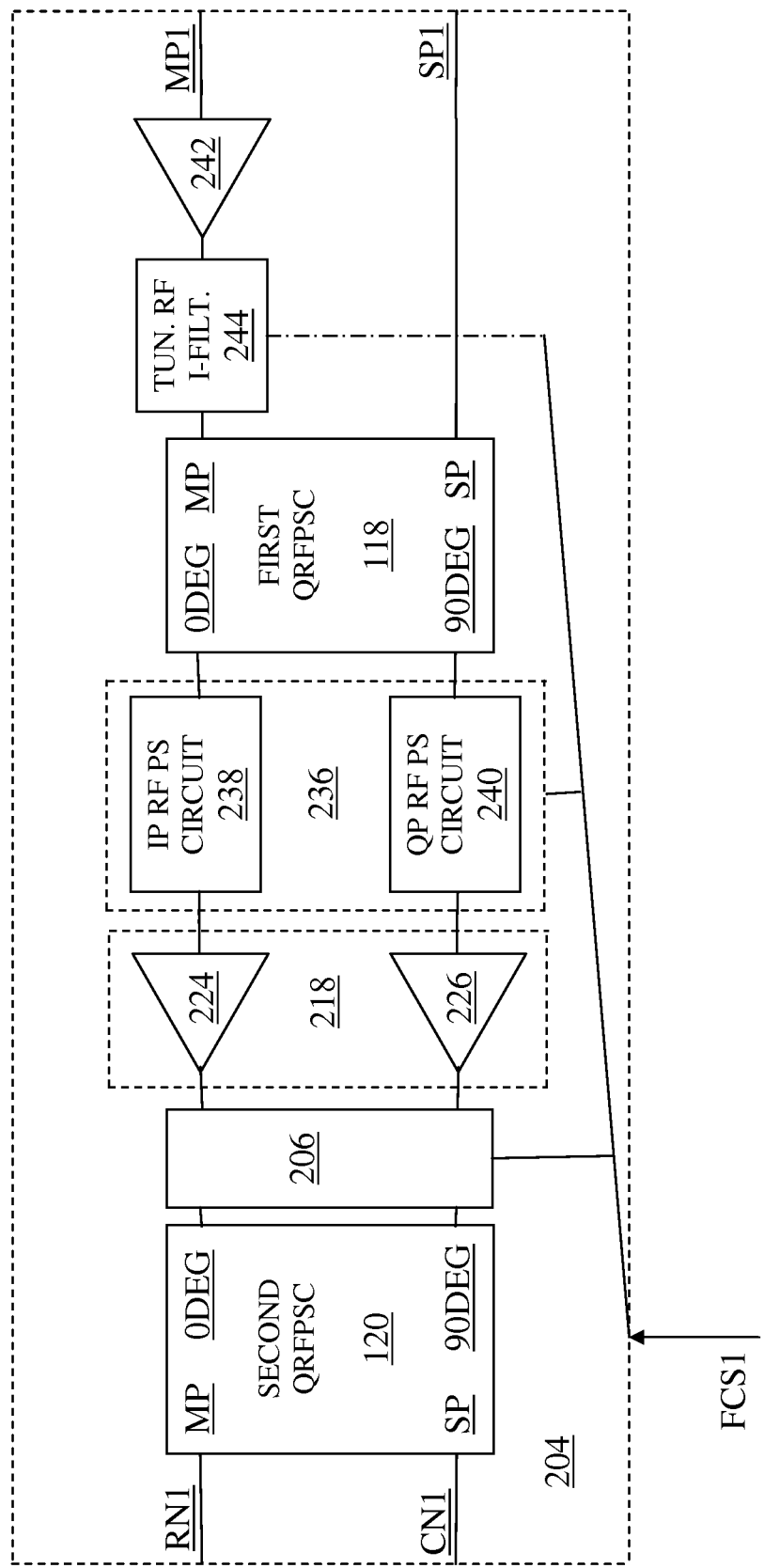
FIG. 22 shows the tunable RF TX/RX diplexing circuit illustrated in FIG. 16 according to a further embodiment of the tunable RF TX/RX diplexing circuit.

FIG. 22 shows the tunable RF TX/RX diplexing circuit 204 illustrated in FIG. 16 according to a further embodiment of the tunable RF TX/RX diplexing circuit 204. The tunable RF TX/RX diplexing circuit 204 illustrated in FIG. 22 is similar to the tunable RF TX/RX diplexing circuit 204 illustrated in FIG. 18, except the tunable RF TX/RX diplexing circuit 204 illustrated in FIG. 22 further includes the tunable quadrature RF phase-shifting circuit 236, the quadrature RF PA output stage 218, an RF PA driver stage 242 and a tunable RF interstage filter 244.

The RF PA driver stage 242 and the tunable RF interstage filter 244 are coupled in series between the first main port MP1 and the main port MP of the first QRFPSC 118, such that the tunable RF interstage filter 244 is coupled between the first main port MP1 and the tunable RF interstage filter 244. The tunable quadrature RF phase-shifting circuit 236, the quadrature RF PA output stage 218, the tunable quadrature RF TX filter 206, and the second QRFPSC 120 are coupled in series between the first QRFPSC 118 and each of the first RX connection node RN1 and the first antenna port CN1.

Figure 23:
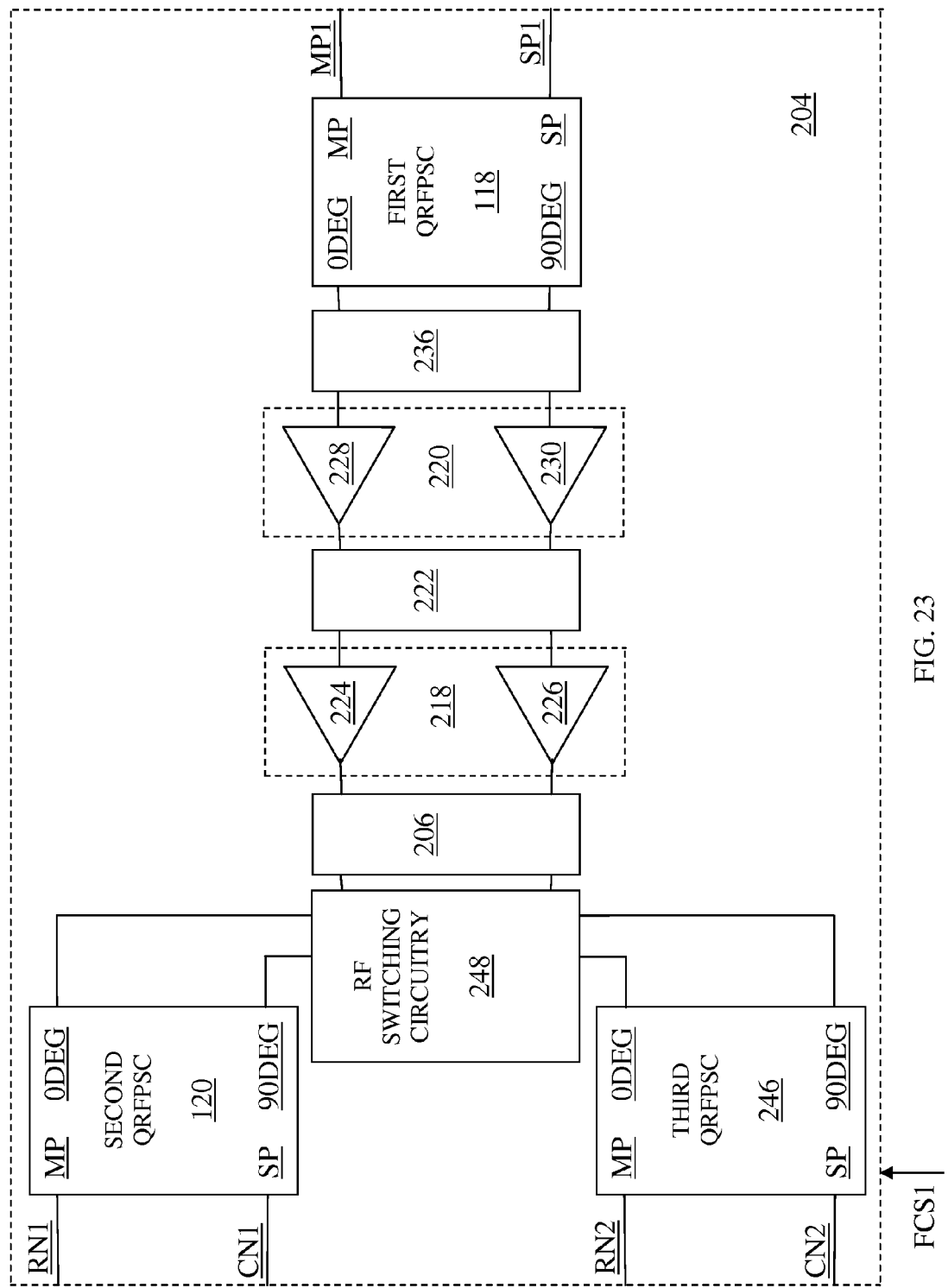
FIG. 23 shows the tunable RF TX/RX diplexing circuit illustrated in FIG. 17 according to one embodiment of the tunable RF TX/RX diplexing circuit.

FIG. 23 shows the tunable RF TX/RX diplexing circuit 204 illustrated in FIG. 17 according to one embodiment of the tunable RF TX/RX diplexing circuit 204. The tunable RF TX/RX diplexing circuit 204 illustrated in FIG. 23 is similar to the tunable RF TX/RX diplexing circuit 204 illustrated in FIG. 21, except the tunable RF TX/RX diplexing circuit 204 illustrated in FIG. 23 further includes a third QRFPSC 246 and RF switching circuitry 248 and the tunable RF TX/RX diplexing circuit 204 further has the second antenna port CN2 and the second RX connection node RN2

A main port MP of the third QRFPSC 246 is coupled to the second RX connection node RN2. An isolation port SP of the third QRFPSC 246 is coupled to the second antenna port CN2. An in-phase port 0DEG and a quadrature-phase port 90DEG of the third QRFPSC 246 are coupled to the RF switching circuitry 248. The in-phase port 0DEG and the quadrature-phase port 90DEG of the second QRFPSC 120 are coupled to the RF switching circuitry 248.

In general, the RF switching circuitry 248 is coupled between the first QRFPSC 118, the second QRFPSC 120, and the third QRFPSC 246. Also, the tunable quadrature RF phase-shifting circuit 236, the quadrature RF PA driver stage 220, the tunable quadrature RF interstage filter 222, the quadrature RF PA output stage 218, and the tunable quadrature RF TX filter 206 are coupled in series between the first QRFPSC 118 and the RF switching circuitry 248.

Figure 24:
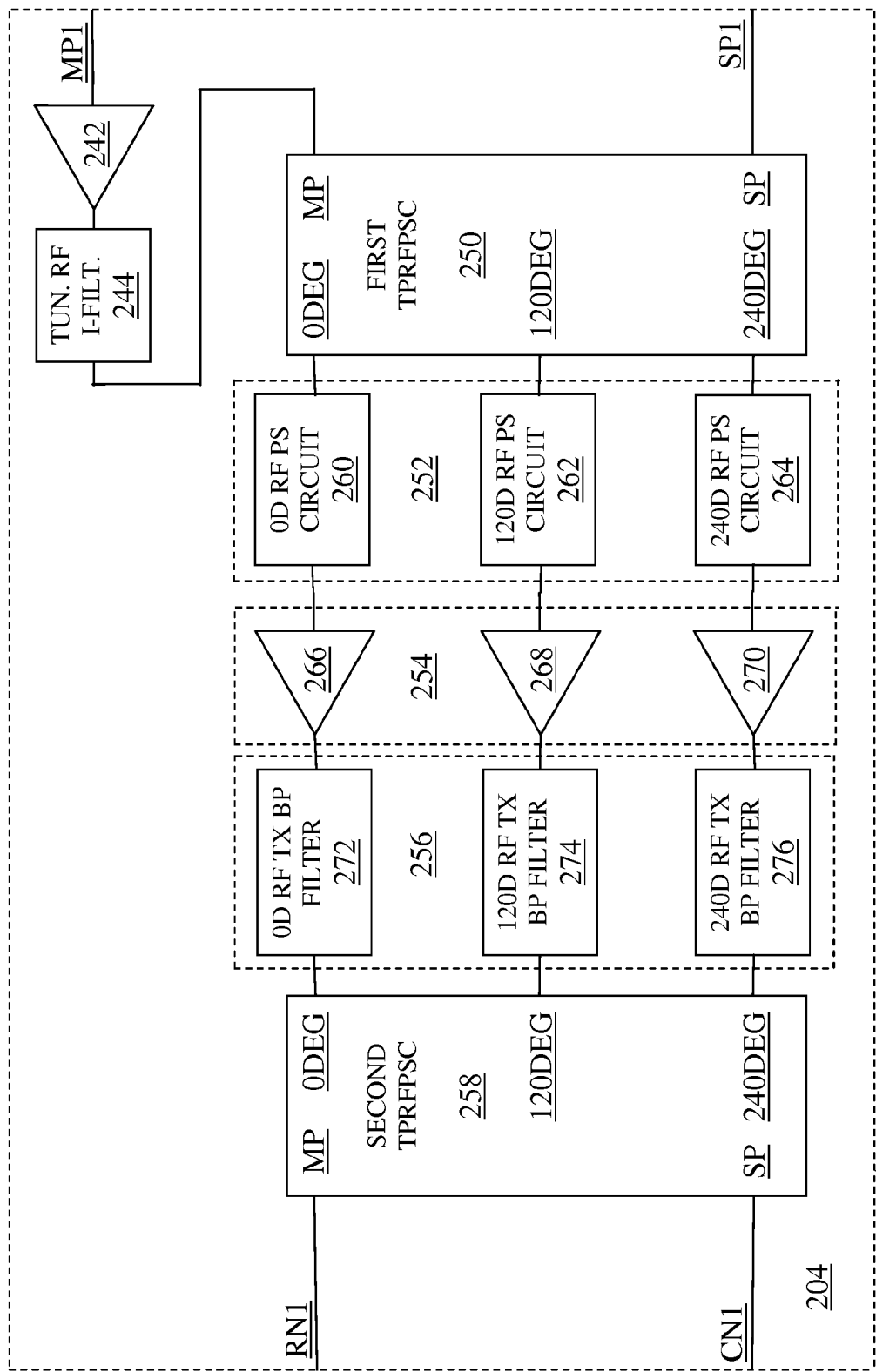
FIG. 24 shows the tunable RF TX/RX diplexing circuit illustrated in FIG. 16 according to one embodiment of the tunable RF TX/RX diplexing circuit.

FIG. 24 shows the tunable RF TX/RX diplexing circuit 204 illustrated in FIG. 16 according to one embodiment of the tunable RF TX/RX diplexing circuit 204. The tunable RF TX/RX diplexing circuit 204 illustrated in FIG. 24 has the first isolation port SP1, the first main port MP1, the first antenna port CN1 and the first RX connection node RN1. Further, the tunable RF TX/RX diplexing circuit 204 includes the RF PA driver stage 242, the tunable RF interstage filter 244, a first tri-phase RF power splitter/combiner (TPRFPSC) 250, a tunable tri-phase RF phase-shifting circuit 252, a tri-phase RF PA output stage 254, a tunable tri-phase RF TX filter 256, and a second TPRFPSC 258.

Each of the first TPRFPSC 250 and the second TPRFPSC 258 has a main port MP, an isolation port SP, an in-phase port 0DEG, a 120 degree port 120DEG, and a 240 degree port 240DEG. In general, the tunable RF TX/RX diplexing circuit 204 illustrated in FIG. 24 is similar to the tunable RF TX/RX diplexing circuit 204 illustrated in FIG. 22, except the tunable RF TX/RX diplexing circuit 204 illustrated in FIG. 24 operates using a tri-phase system instead of using a quadrature-phase system.

The RF PA driver stage 242 and the tunable RF interstage filter 244 are coupled in series between the first main port MP1 and the main port MP of the first TPRFPSC 250. The first isolation port SP1 is coupled to the isolation port SP of the first TPRFPSC 250. The first RX connection node RN1 is coupled to the main port MP of the second TPRFPSC 258. The first antenna port CN1 is coupled to the isolation port SP of the second TPRFPSC 258.

The tunable tri-phase RF phase-shifting circuit 252, the tri-phase RF PA output stage 254, and the tunable tri-phase RF TX filter 256 are coupled in series between the first TPRFPSC 250 and the second TPRFPSC 258. As such, the RF PA driver stage 242, the tunable RF interstage filter 244, the first TPRFPSC 250, the tunable tri-phase RF phase-shifting circuit 252, the tri-phase RF PA output stage 254, the tunable tri-phase RF TX filter 256, and the second TPRFPSC 258 are coupled in series between the first main port MP1 and each of the first RX connection node RN1 and the first antenna port CN1. In general, the first TPRFPSC 250, the tunable tri-phase RF TX filter 256, and the second TPRFPSC 258 are coupled in series between the first main port MP1 and each of the first RX connection node RN1 and the first antenna port CN1.

The tunable tri-phase RF phase-shifting circuit 252 includes a 0 degree RF phase-shifting circuit 260, a 120 degree RF phase-shifting circuit 262, and a 240 degree RF phase-shifting circuit 264. The tri-phase RF PA output stage 254 includes a 0 degree RF output stage 266, a 120 degree RF output stage 268, and a 240 degree RF output stage 270. The tunable tri-phase RF TX filter 256 includes a 0 degree RF TX bandpass filter 272, a 120 degree RF TX bandpass filter 274, and a 240 degree RF TX bandpass filter 276.

The tunable tri-phase RF phase-shifting circuit 252 is coupled between the first TPRFPSC 250 and the tri-phase RF PA output stage 254. The tunable tri-phase RF TX filter 256 is coupled between the tri-phase RF PA output stage 254 and the second TPRFPSC 258.

In this regard, the 0 degree RF phase-shifting circuit 260 is coupled between the in-phase port 0DEG of the first TPRFPSC 250 and the 0 degree RF output stage 266. The 120 degree RF phase-shifting circuit 262 is coupled between the 120 degree port 120DEG of the first TPRFPSC 250 and the 120 degree RF output stage 268. The 240 degree RF phase-shifting circuit 264 is coupled between the 240 degree port 240DEG of the first TPRFPSC 250 and the 240 degree RF output stage 270.

Further, the 0 degree RF TX bandpass filter 272 is coupled between the 0 degree RF output stage 266 and the in-phase port 0DEG of the second TPRFPSC 258. The 120 degree RF TX bandpass filter 274 is coupled between the 120 degree RF output stage 268 and the 120 degree port 120DEG of the second TPRFPSC 258. The 240 degree RF TX bandpass filter 276 is coupled between the 240 degree RF output stage 270 and the 240 degree port 240DEG of the second TPRFPSC 258.

RF transmit signals received via the main port MP of the first TPRFPSC 250 will nominally be split into three tri-phase RF signals, such that each of the three tri-phase RF signals has a nominal magnitude and each of the three tri-phase RF signals is nominally phase-shifted from a remainder of the three RF signals by 120 degrees. The three tri-phase RF signals are provided by the in-phase port 0DEG, the 120 degree port 120DEG, and the 240 degree port 240DEG of the first TPRFPSC 250.

When the second TPRFPSC 258 receives the three tri-phase RF signals via the in-phase port 0DEG, the 120 degree port 120DEG, and the 240 degree port 240DEG of the second TPRFPSC 258, the second TPRFPSC 258 nominally phase-shifts the three tri-phase RF signals into alignment and then combines the three phase-aligned RF signals to provide an RF transmit signal via the isolation port SP of the second TPRFPSC 258.

Figure 25:
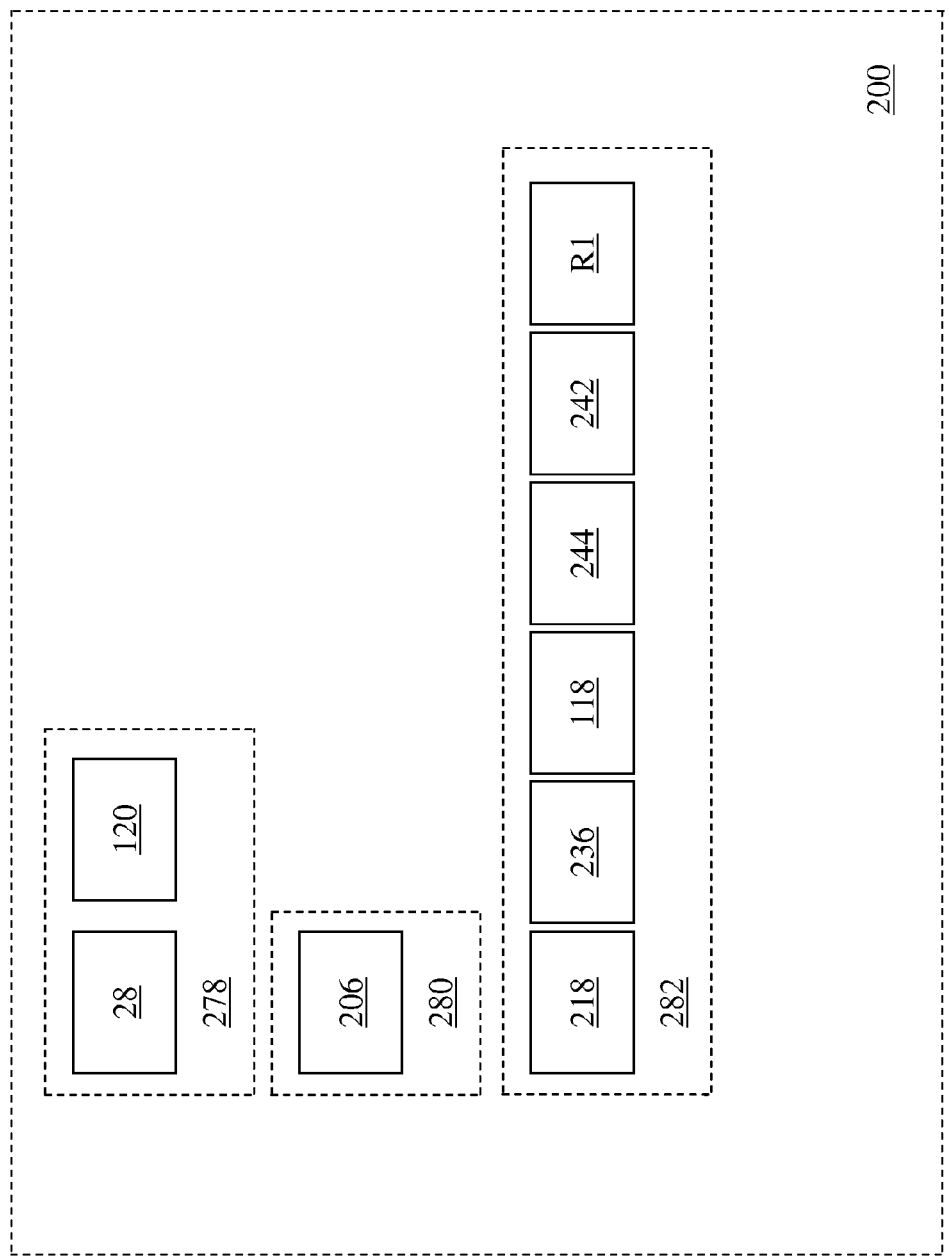
FIG. 25 shows the tunable RF TX/RX multiplexer illustrated in FIG. 16 according to one embodiment of the tunable RF TX/RX multiplexer.

FIG. 25 shows the tunable RF TX/RX multiplexer 200 illustrated in FIG. 16 according to one embodiment of the tunable RF TX/RX multiplexer 200. The tunable RF TX/RX multiplexer 200 includes a first structure 278, a second structure 280, and a third structure 282. In one embodiment of the first structure 278, the first structure 278 includes the first group 28 of RF RX bandpass filters and the second QRFPSC 120. In one embodiment of the second structure 280, the second structure 280 includes the tunable quadrature RF TX filter 206. In one embodiment of the third structure 282, the third structure 282 includes the quadrature RF PA output stage 218, the tunable quadrature RF phase-shifting circuit 236, the first QRFPSC 118, the tunable RF interstage filter 244, the RF PA driver stage 242, and the first resistive element R1.

In one embodiment of the first structure 278, the first structure 278 is an acoustic based substrate. In a first embodiment of the first structure 278, the first structure 278 is a surface acoustic wave (SAW) substrate. In a second embodiment of the first structure 278, the first structure 278 is a bulk acoustic wave (BAW) substrate.

In one embodiment of the second structure 280, the second structure 280 includes a first laminate and at least a first silicon-on-insulator (SOI) semiconductor die. In one embodiment of the first laminate, the first laminate includes a first group of inductive elements. In one embodiment of the first SOI semiconductor die, the first SOI semiconductor die includes a first group of capacitive elements. In one embodiment of the third structure 282, the third structure 282 includes a second laminate, which includes a second group of inductive elements.

In one embodiment of the tunable quadrature RF TX filter 206, the tunable quadrature RF TX filter 206 includes at least a portion of the first group of inductive elements and at least a portion of the first group of capacitive elements. In one embodiment of the first QRFPSC 118, the first QRFPSC 118 includes at least a portion of the second group of inductive elements.

Figure 26:
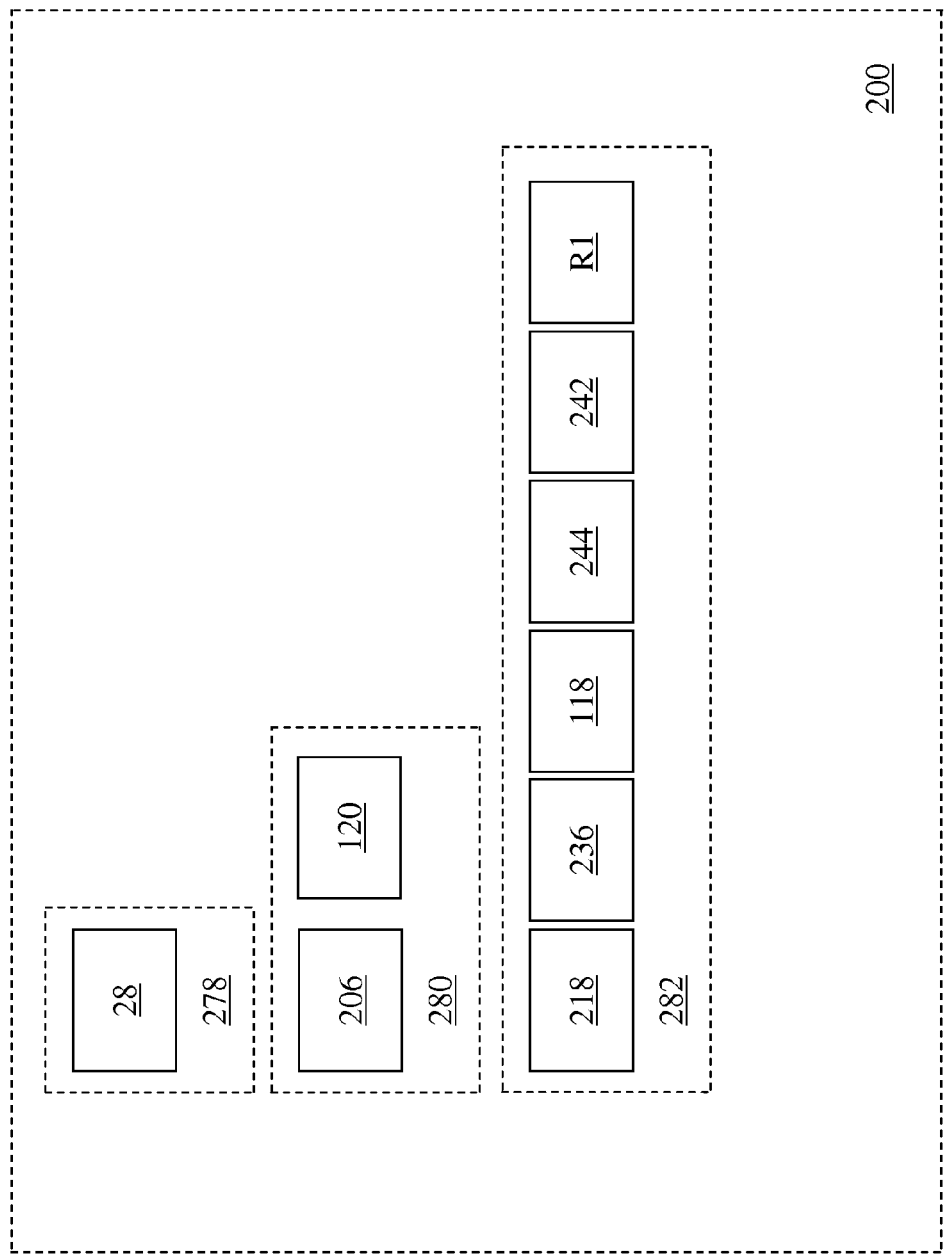
FIG. 26 shows the tunable RF TX/RX multiplexer illustrated in FIG. 16 according to an alternate embodiment of the tunable RF TX/RX multiplexer.

FIG. 26 shows the tunable RF TX/RX multiplexer 200 illustrated in FIG. 16 according to an alternate embodiment of the tunable RF TX/RX multiplexer 200. The tunable RF TX/RX multiplexer 200 illustrated in FIG. 26 is similar to the tunable RF TX/RX multiplexer 200 illustrated in FIG. 25, except in the tunable RF TX/RX multiplexer 200 illustrated in FIG. 26, the second structure 280 includes the second QRFPSC 120 instead of the first structure 278 including the second QRFPSC 120.

Figure 27:
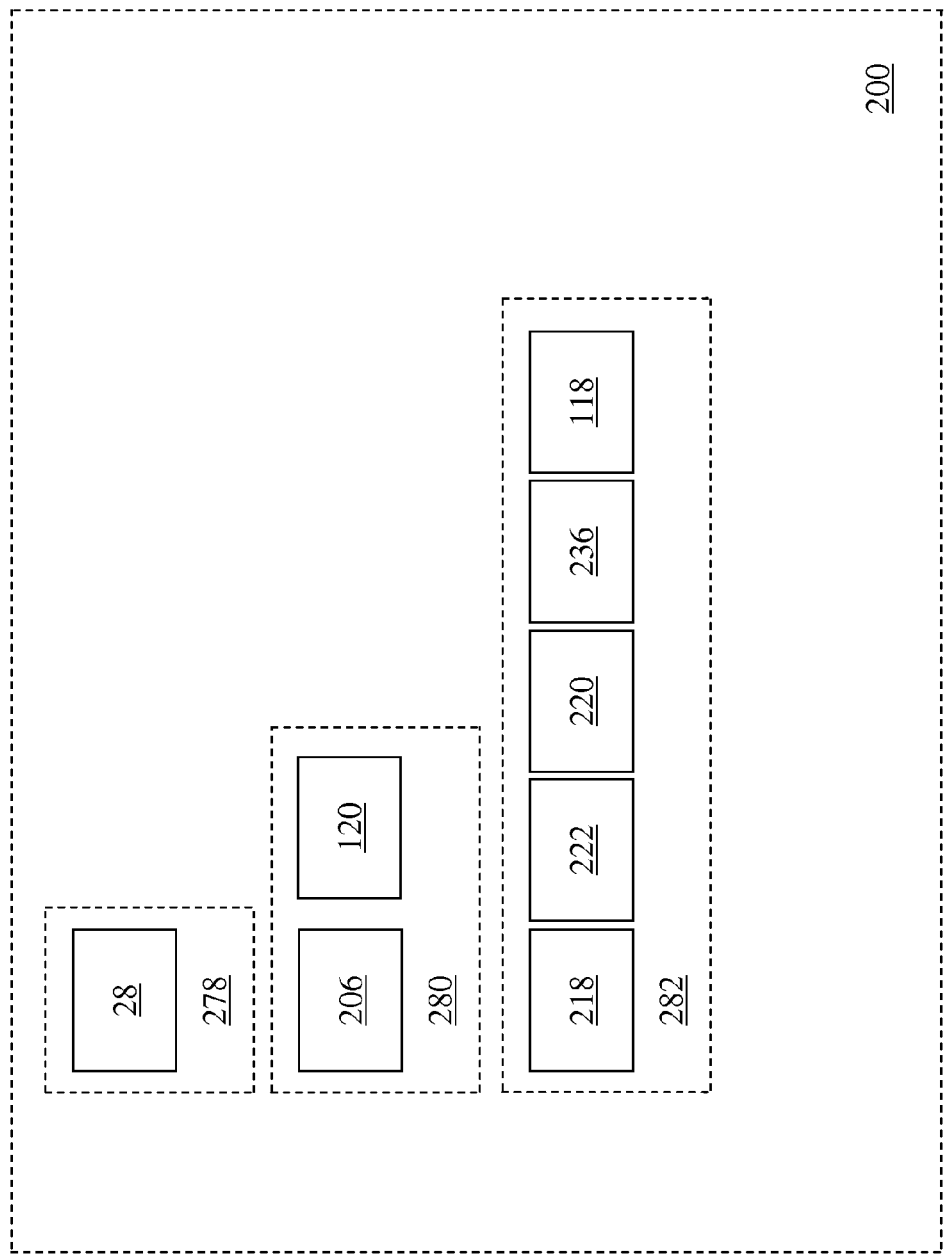
FIG. 27 shows the tunable RF TX/RX multiplexer 200 illustrated in FIG. 16 according to an additional embodiment of the tunable RF TX/RX multiplexer 200.

FIG. 27 shows the tunable RF TX/RX multiplexer 200 illustrated in FIG. 16 according to an additional embodiment of the tunable RF TX/RX multiplexer 200. The tunable RF TX/RX multiplexer 200 illustrated in FIG. 27 is similar to the tunable RF TX/RX multiplexer 200 illustrated in FIG. 26, except in the tunable RF TX/RX multiplexer 200 illustrated in FIG. 27, the third structure 282 further includes the quadrature RF PA driver stage 220 and the tunable quadrature RF interstage filter 222 and omits the RF PA driver stage 242, the tunable RF interstage filter 244, and the first resistive element R1.

Figure 28:
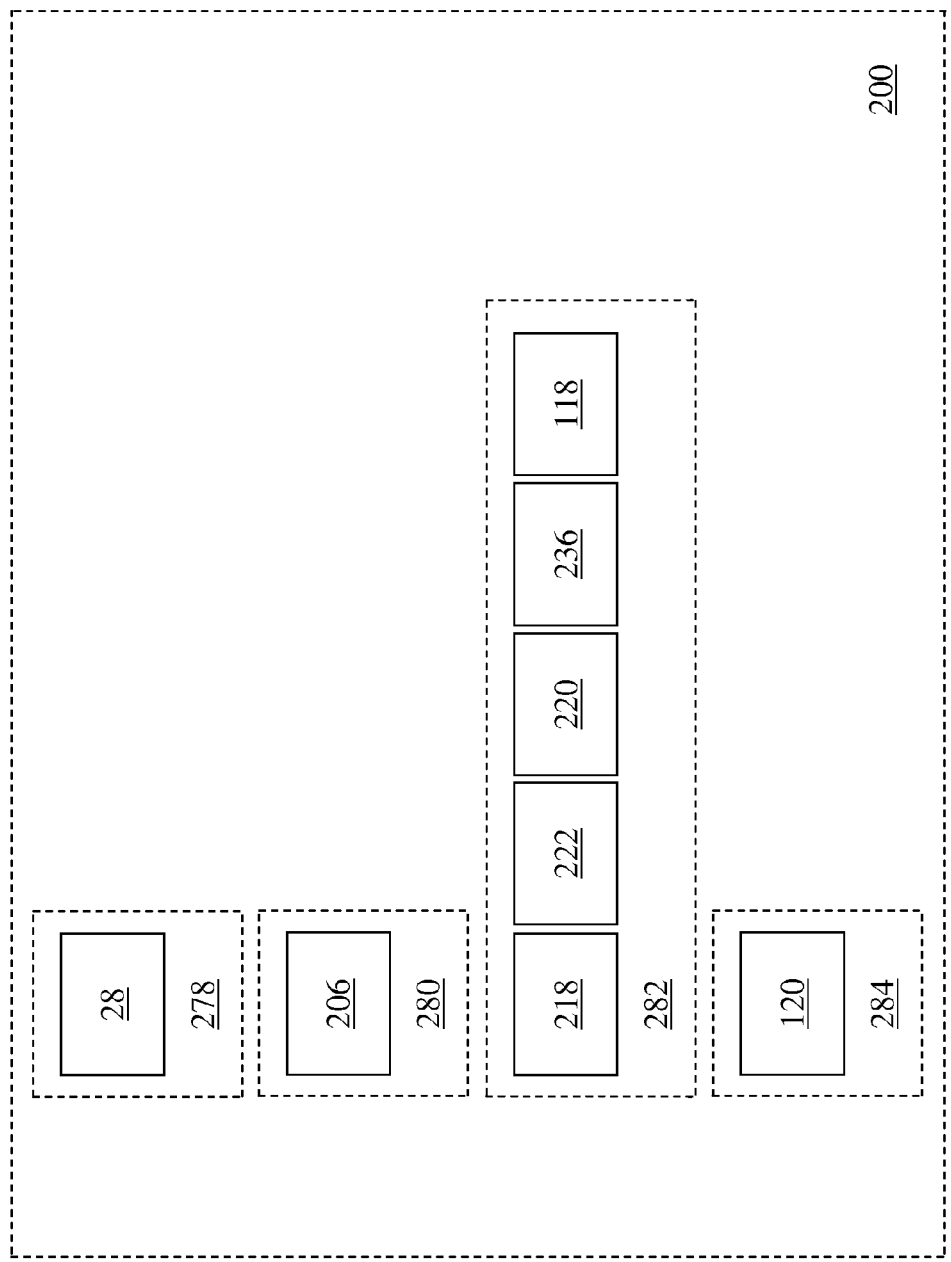
FIG. 28 shows the tunable RF TX/RX multiplexer 200 illustrated in FIG. 16 according to another embodiment of the tunable RF TX/RX multiplexer 200.

FIG. 28 shows the tunable RF TX/RX multiplexer 200 illustrated in FIG. 16 according to another embodiment of the tunable RF TX/RX multiplexer 200. The tunable RF TX/RX multiplexer 200 illustrated in FIG. 28 is similar to the tunable RF TX/RX multiplexer 200 illustrated in FIG. 27, except the tunable RF TX/RX multiplexer 200 illustrated in FIG. 28 further includes a fourth structure 284, such that the second QRFPSC 120 is moved from the second structure 280 to the fourth structure 284. Further, in one embodiment of the fourth structure 284, the fourth structure 284 is an integrated passive device (IPD) based structure.

Figure 29:
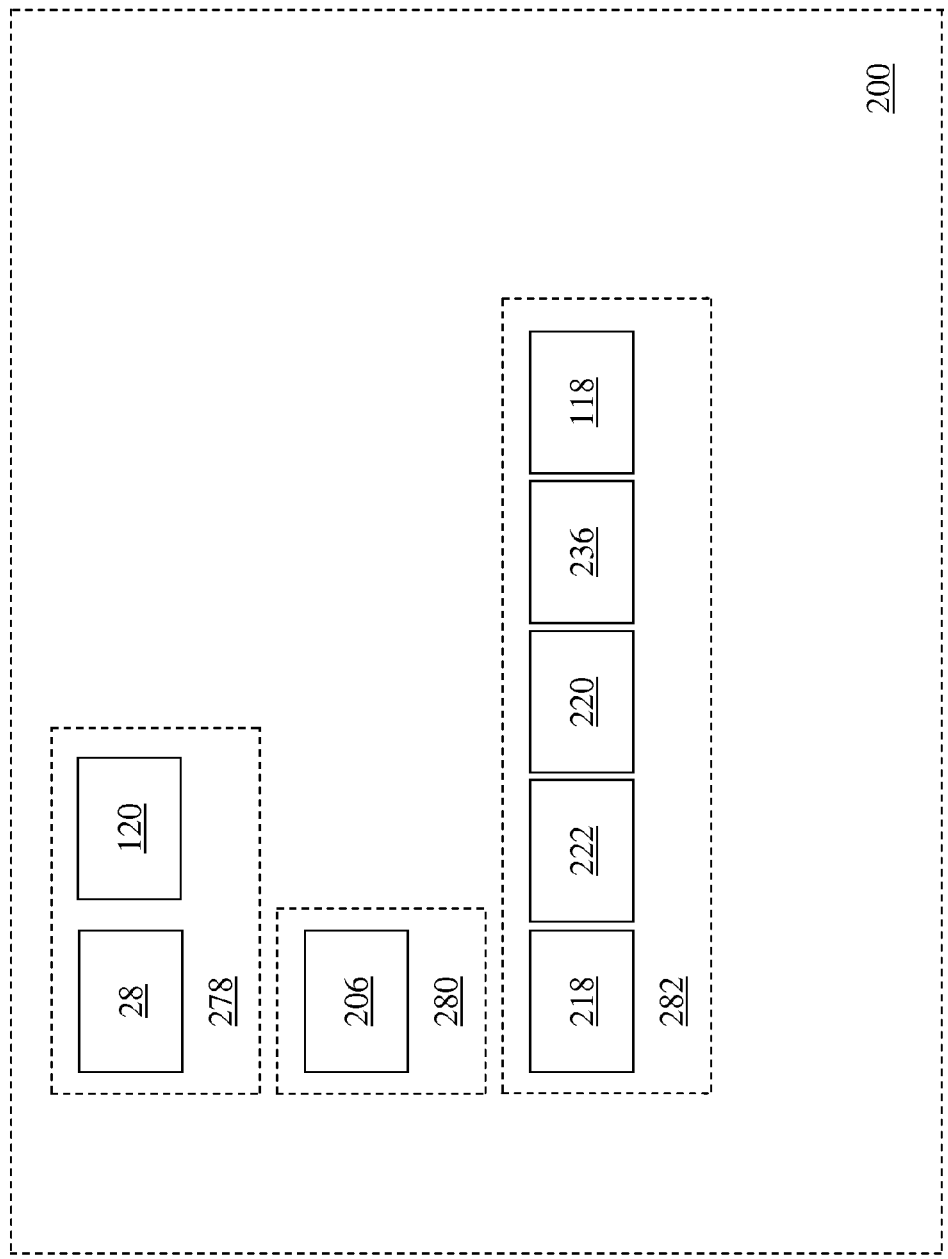
FIG. 29 shows the tunable RF TX/RX multiplexer 200 illustrated in FIG. 16 according to a further embodiment of the tunable RF TX/RX multiplexer 200.

FIG. 29 shows the tunable RF TX/RX multiplexer 200 illustrated in FIG. 16 according to a further embodiment of the tunable RF TX/RX multiplexer 200. The tunable RF TX/RX multiplexer 200 illustrated in FIG. 29 is similar to the tunable RF TX/RX multiplexer 200 illustrated in FIG. 27, except in the tunable RF TX/RX multiplexer 200 illustrated in FIG. 29, the second QRFPSC 120 is moved from the second structure 280 to the first structure 278.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:
1. A tunable RF transmit/receive (TX/RX) multiplexer comprising:
   a tunable RF TX/RX diplexing circuit having a first RX connection node and a first antenna port; and
   a first plurality of RF RX bandpass filters, wherein:
      each of the first plurality of RF RX bandpass filters is coupled to the first RX connection node; and
      at least two of the first plurality of RF RX bandpass filters are configured to simultaneously receive and filter respective RF input signals via the first RX connection node to provide respective filtered RF input signals.

2. The tunable RF TX/RX multiplexer of claim 1 wherein the tunable RF TX/RX diplexing circuit is configured to simultaneously receive a plurality of first antenna RF RX signals via the first antenna port to provide the respective RF input signals.

3. The tunable RF TX/RX multiplexer of claim 2 wherein the plurality of first antenna RF RX signals are receive downlink carrier aggregation (RXDLCA) RF signals.

4. The tunable RF TX/RX multiplexer of claim 1 wherein the tunable RF TX/RX diplexing circuit further has a first main port and is configured to receive and filter an RF TX signal via the first main port to provide an RF antenna TX signal via the first antenna port.

5. The tunable RF TX/RX multiplexer of claim 4 wherein an RF power amplifier is configured to provide the RF TX signal.

6. The tunable RF TX/RX multiplexer of claim 1 wherein the tunable RF TX/RX diplexing circuit further has a first main port and comprises a tunable quadrature RF TX filter, a first quadrature RF power splitter/combiner (QRFPSC), and a second QRFPSC; such that the first QRFPSC is coupled to the first main port, the second QRFPSC is coupled to the first RX connection node and the first antenna port, and the tunable quadrature RF TX filter is coupled between the first QRFPSC and the second QRFPSC.

7. The tunable RF TX/RX multiplexer of claim 6 wherein a bandpass center frequency of the tunable quadrature RF TX filter is based on a function configuration signal.

8. The tunable RF TX/RX multiplexer of claim 6 wherein the tunable RF TX/RX diplexing circuit further comprises a quadrature RF power amplifier coupled between the tunable quadrature RF TX filter and the first QRFPSC.

9. The tunable RF TX/RX multiplexer of claim 6 wherein the tunable RF TX/RX diplexing circuit further comprises a quadrature RF PA driver stage, a tunable quadrature RF interstage filter, and a quadrature RF PA output stage; such that the quadrature RF PA driver stage, the tunable quadrature RF interstage filter, the quadrature RF PA output stage, and the tunable quadrature RF TX filter are coupled in series between the first QRFPSC and the second QRFPSC.

10. The tunable RF TX/RX multiplexer of claim 6 wherein the tunable RF TX/RX diplexing circuit further comprises a quadrature RF PA driver stage, a tunable quadrature RF interstage filter, a quadrature RF PA output stage, and a tunable quadrature RF phase-shifting circuit, such that the tunable quadrature RF phase-shifting circuit, the quadrature RF PA driver stage, the tunable quadrature RF interstage filter, the quadrature RF PA output stage, and the tunable quadrature RF TX filter are coupled in series between the first QRFPSC and the second QRFPSC.

11. The tunable RF TX/RX multiplexer of claim 1 wherein the tunable RF TX/RX diplexing circuit further has a first main port and comprises a tunable quadrature RF TX filter, a first quadrature RF power splitter/combiner (QRFPSC), a second QRFPSC, a tunable quadrature RF phase-shifting circuit, a quadrature RF PA output stage, an RF PA driver stage, and a tunable RF interstage filter; such that the tunable RF interstage filter and the RF PA driver stage are coupled in series between the first main port and the first QRFPSC; and the tunable quadrature RF phase-shifting circuit, the quadrature RF PA output stage, the tunable quadrature RF TX filter, and the second QRFPSC are coupled in series between the first QRFPSC and each of the first RX connection node and the first antenna port.

12. The tunable RF TX/RX multiplexer of claim 1 wherein the tunable RF TX/RX diplexing circuit further has a first main port and comprises a first tri-phase RF power splitter/combiner (TPRFPSC), a tunable tri-phase RF TX filter, and a second TPRFPSC coupled in series between the first main port and each of the first RX connection node and the first antenna port.

13. The tunable RF TX/RX multiplexer of claim 1 wherein the tunable RF TX/RX diplexing circuit further has a first main port and comprises an RF PA driver stage, a tunable RF interstage filter, a first tri-phase RF power splitter/combiner (TPRFPSC), a tunable tri-phase RF phase-shifting circuit, a tri-phase RF PA output stage, a tunable tri-phase RF TX filter and a second TPRFPSC coupled in series between the first main port and each of the first RX connection node and the first antenna port.

14. The tunable RF TX/RX multiplexer of claim 1 further comprising a second plurality of RF RX bandpass filters, wherein:
the tunable RF TX/RX diplexing circuit further has a second RX connection node and a second antenna port, which is coupled to a second RF antenna;
each of the second plurality of RF RX bandpass filters is coupled to the second RX connection node; and
each of the second plurality of RF RX bandpass filters is configured to receive and filter a respective RF input signal via the second RX connection node to provide a respective filtered RF input signal.

15. The tunable RF TX/RX multiplexer of claim 14 wherein the tunable RF TX/RX diplexing circuit further has a first main port and comprises a first quadrature RF power splitter/combiner (QRFPSC), a second QRFPSC, a third QRFPSC, and RF switching circuitry, such that the first main port is coupled to the first QRFPSC, the first antenna port and the first RX connection node are coupled to the second QRFPSC, the second antenna port and the second RX connection node are coupled to the third QRFPSC, and the RF switching circuitry is coupled between the first QRFPSC, the second QRFPSC, and the third QRFPSC.

16. The tunable RF TX/RX multiplexer of claim 1 further comprising a first structure, a second structure, and a third structure, such that the first structure comprises the first plurality of RF RX bandpass filters; the tunable RF TX/RX diplexing circuit comprises a tunable quadrature RF TX filter, a first quadrature RF power splitter/combiner (QRFPSC), and a second QRFPSC; the second structure comprises the tunable quadrature RF TX filter; and the third structure comprises the first QRFPSC.

17. The tunable RF TX/RX multiplexer of claim 16 wherein the first structure is an acoustic based substrate that is one of a surface acoustic wave based substrate and a bulk acoustic wave based substrate; the second structure comprises a laminate comprising a first plurality of inductive elements and at least one silicon-on-insulator semiconductor die comprising a first plurality of capacitive elements; the third structure comprises a laminate comprising a second plurality of inductive elements; the tunable quadrature RF TX filter comprises at least a portion of the first plurality of inductive elements and at least a portion of the first plurality of capacitive elements; and the first QRFPSC comprises at least a portion of the second plurality of inductive elements.

18. The tunable RF TX/RX multiplexer of claim 16 wherein the first structure further comprises the second QRFPSC.

19. The tunable RF TX/RX multiplexer of claim 16 wherein the second structure further comprises the second QRFPSC.

20. The tunable RF TX/RX multiplexer of claim 16 further comprising a fourth structure, which is an integrate passive device (IPD) based structure, wherein the fourth structure comprises the second QRFPSC.

* * * * *